United States Patent
Morimoto et al.

(10) Patent No.: US 8,533,749 B2
(45) Date of Patent: Sep. 10, 2013

(54) MOUNTING STRUCTURE OF MAGNETIC MEMBER, METHOD OF BONDING MAGNETIC MEMBER AND MAGNETIC COUPLING MEMBER, PICKUP UNIT, AND DISC APPARATUS

(71) Applicant: Sanyo Electric Co., Ltd., Osaka (JP)

(72) Inventors: Shunichi Morimoto, Ota (JP); Kenichi Imai, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 13/657,584

(22) Filed: Oct. 22, 2012

(65) Prior Publication Data

US 2013/0043371 A1    Feb. 21, 2013

Related U.S. Application Data

(62) Division of application No. 12/762,237, filed on Apr. 16, 2010.

(30) Foreign Application Priority Data

Jun. 11, 2009    (JP) ................................. 2009-139778
Aug. 21, 2009    (JP) ................................. 2009-192004

(51) Int. Cl.
*G11B 7/09*    (2006.01)
*G11B 7/12*    (2012.01)

(52) U.S. Cl.
USPC ........................................................ 720/683

(58) Field of Classification Search
USPC ........... 720/683; 310/28, 49, 154.03, 154.07, 310/154.08
See application file for complete search history.

(56) References Cited

FOREIGN PATENT DOCUMENTS

| JP | 2007226081 A | * | 9/2007 |
| JP | 2008220044 A | * | 9/2008 |
| JP | 2008278683 A | * | 11/2008 |

* cited by examiner

*Primary Examiner* — Will J Klimowicz
(74) *Attorney, Agent, or Firm* — SoCal IP Law Group LLP; Steve C. Sereboff; John E. Gunther

(57) ABSTRACT

A mounting structure of a magnetic member at least includes: a magnetic member; a magnetic coupling member mounted with the magnetic member; and an adhesive member bonding the magnetic member to the magnetic coupling member, either one or both of the magnetic member and the magnetic coupling member provided with an adhesion securing portion configured to secure adhesive strength, either one or both of the magnetic member and the magnetic coupling member provided with an adhesive member reservoir portion configured to lead the adhesive member to the adhesion securing portion.

3 Claims, 9 Drawing Sheets

MOUNTING STRUCTURE OF MAGNETIC MEMBER, METHOD OF BONDING MAGNETIC MEMBER AND MAGNETIC COUPLING MEMBER, PICKUP UNIT, AND DISC APPARATUS

CROSS-REFERENCE TO RELATED APPLICATIONS

This is a divisional application of application Ser. No. 12/762,237 filed on Apr. 16, 2010, which claims the benefit of priority to Japanese Patent Application Nos. 2009-139778 and 2009-192004, filed Jun. 11, 2009 and Aug. 21, 2009, respectively, of which full contents are incorporated herein by reference.

BACKGROUND OF THE INVENTION

1. Field of the Invention

The present invention relates to a mounting structure of a magnetic member, a method of bonding the magnetic member and a magnetic coupling member, a pickup unit, and a disc apparatus.

2. Description of the Related Art

FIGS. 9A and 9B illustrate one embodiment of a mounting structure of a magnetic member and a method of bonding a magnetic member and a magnetic coupling member.

In an objective lens actuator for an optical pickup unit, high drive sensitivity is achieved by reducing the weight of a movable portion (not shown) of the actuator and increasing the volume of a magnet 550 disposed on a fixed portion 507 of the actuator to obtain large magnetic flux density from the magnet 550. An actuator means a driving apparatus that converts energy into translational motion or rotational motion, etc., for example. For the objective lens actuator, etc., for the optical pickup unit, a potting adhesive (not shown), which is cured by UV (Ultraviolet radiation) light, etc., is often used heavily to speed up an actuator assembling process, for example.

Other types of optical pickup units includes a moving magnet (MM) type optical pickup that enhances the adhesive strength between a lens holder and a yoke to reduce unnecessary vibrations, for example (see, e.g., Japanese Patent Application Laid-Open Publication No. H11-259877, pp. 1, 3 and 4, FIGS. 1 to 4). "Yoke" is considered as an object that reduces a leakage of magnetic force generated from a magnet, for example.

However, when the optical pickup unit or the actuator for the optical pickup unit accidentally drops and the actuator mounted with the magnet 550 receives an impact resulting from such a drop, the position deviation of the magnet 550 relative to a back yoke 510 may occur because of the weight/mass of the magnet 550. For this reason, strong adhesion is required between the back yoke 510 and the magnet 550.

When an ordinary potting adhesive which is cured by UV light, etc., is used on a bonding portion, however, improvement in adhesion may not be expected. When an adhesive surface 551 of the magnet 550 is fitted to an adhesive surface 511 of the back yoke 510 in a state where a UV-curing adhesive not shown is interposed between the adhesive surface 551 of the magnet 550 and the adhesive surface 511 of the back yoke 510, UV light is blocked by the magnet 550 and the back yoke 510 to be unable to reach the adhesive surfaces 551 and 511, which prevents the UV-curing adhesive from curing between the adhesive surfaces 551 and 511. Therefore, when the magnet 550 is bonded to the back yoke 510 using the UV-curing adhesive, the UV-curing potting adhesive is allowed to be applied only to the periphery of the magnet 550. This causes a problem that the UV-curing adhesive cannot be applied to the magnet 550 and the broad adhesive surface 511 of the back yoke 510.

The adhesive strength of the magnet 550 to the back yoke 510 may drop due to changes in humidity and temperature. When the magnet 550 is bonded to the back yoke 510 using the UV-curing adhesive, if the UV-curing potting adhesive is applied only to the periphery of the magnet 550 to be left cured thereon and, impact resulting from the drop of the actuator, etc., is given to the actuator mounted with the magnet 550 in such a situation, for example, the adhesion is not able to overcome a dropping force of the magnet 550 generated by its weight and mass, which causes another problem.

It is desirable, therefore, that an adhesive 560 be applied as widely as possible to the whole contact surface of the back yoke 510 to be mounted with the magnet 550, to bond the magnet 550 to the back yoke 510, thereby securing the adhesive strength of the magnet 550 to the back yoke 510. In this case, UV light does not reach the adhesive surface 551 of the magnet 550 and the adhesive surface 511 of the back yoke 510, so that the UV-curing adhesive not shown can not be used. When the magnet 550 is bonded to the back yoke 510 with the adhesive 560 in a state of being interposed between the adhesive surface 551 of the magnet 550 and the adhesive surface 511 of the back yoke 510, such an adhesive 560 is used that can cure under a lightless environment, e.g., one-component thermosetting adhesive 560, two-component mixed adhesive 560, and an anaerobic curing type.

It is preferable that the adhesive area of the adhesive surface 551 of the magnet 550 and the adhesive area of the adhesive surface 511 of the back yoke 510 be large in order to improve the adhesive strength of the magnet 550 to the back yoke 510. In order to apply the adhesive 560 to the adhesive surfaces 511 and 551 having large areas, it is desirable to apply the adhesive 560 in advance to the adhesive surfaces 511 of the back yoke 510 by a pre-application process, for example. However, when the adhesive 560 is applied in advance to the adhesive surfaces 511 of the back yoke 510 and then the magnet 550 is attached to the back yoke 510 coated with the adhesive 560, since the magnet 550 has the strong magnetic force, so that the magnet 550 is placed being sliding on the back yoke 510. At this time, the magnet 550 acts like a paddle against the adhesive 560, and thus, it may be possible for the magnet 550 to scrape off the adhesive 560 applied in advance to the back yoke 510.

In both cases of applying in advance the adhesive 560 to the back yoke 510 before an assembling process of placing the magnet 550 on the back yoke 510 and of applying the adhesive 560 to the back yoke 510 right after disposing the magnet 550 near the back yoke 510, the use of the permanently magnetized magnet 550 generating a strong magnetic force makes it difficult to confirm the magnet 550 is bonded to the back yoke 510 on a sufficiently large adhesive area.

SUMMARY OF THE INVENTION

A mounting structure of a magnetic member according to an aspect of the present invention, at least includes: a magnetic member; a magnetic coupling member mounted with the magnetic member; and an adhesive member bonding the magnetic member to the magnetic coupling member, either one or both of the magnetic member and the magnetic coupling member provided with an adhesion securing portion configured to secure adhesive strength, either one or both of the magnetic member and the magnetic coupling member provided with an adhesive member reservoir portion configured to lead the adhesive member to the adhesion securing portion.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
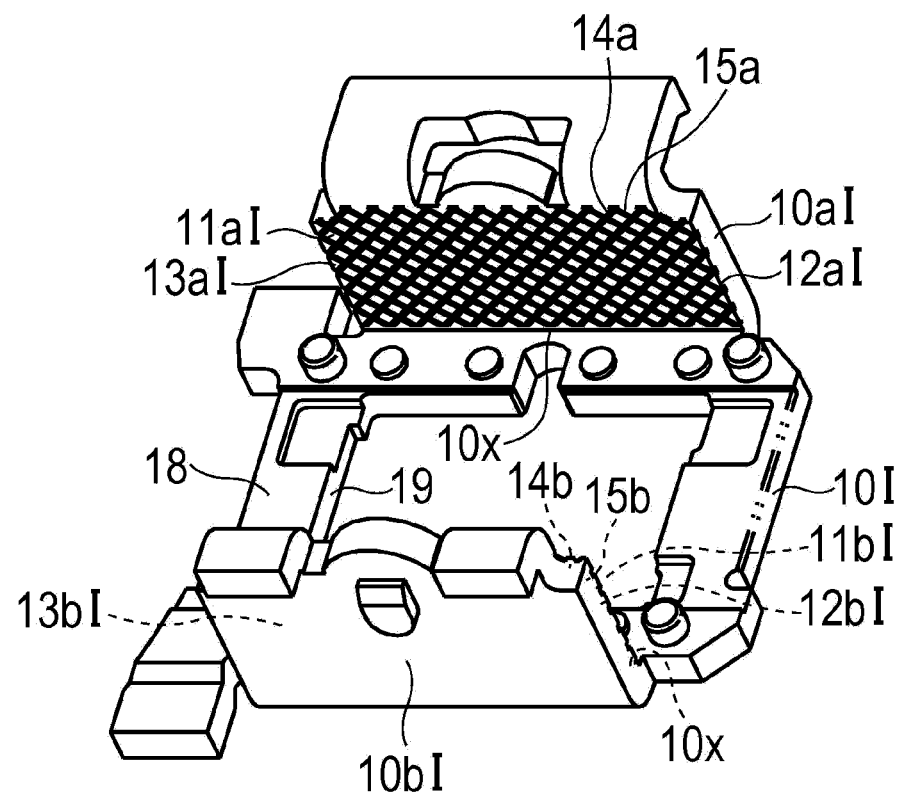
FIG. 1 is an explanatory diagram of a mounting structure of a magnetic member and a method of bonding the magnetic member and a magnetic coupling member according to a first embodiment of the present invention.

At least the following details will become apparent from descriptions of this specification and of the accompanying drawings.

An embodiment of the present invention is considered to be applicable to a pickup unit, a disc apparatus, a mounting structure of a magnetic member included in the apparatuses, a method of bonding the magnetic member and a magnetic coupling member included in the apparatuses, the pickup unit and the disc apparatus being capable of reproducing data, information, signals, etc., recorded in such various media as optical discs of "CD" (Compact Disc: trademark), "DVD" (Digital Versatile Disc: registered trademark), "HD DVD" (High Definition DVD: registered trademark), "CBHD" (China Blue High-Definition), and "Blue-ray Disc" (registered trademark), recording data, information, signals, etc., in such various media as writable or rewritable optical discs, and deleting data, information, signals, etc., recorded in such various media as writable or rewritable optical discs, for example.

A mounting structure of a magnetic member according to an embodiment of the present invention at least includes a magnetic member and a magnetic coupling member provided with an adhesion securing portion configured to secure adhesive strength when bonded to the magnetic member.

According to a configuration described above, the magnetic member is securely bonded to the magnetic coupling member. The magnetic coupling member is, for example, a member that structurally supports a magnetic coupling. The adhesive strength is secured by the adhesion securing portion disposed on the magnetic coupling member, so that the magnetic member is securely bonded to the magnetic coupling member.

A mounting structure of a magnetic member according to an embodiment of the present invention at least includes a magnetic member, a magnetic coupling member mounted with the magnetic member, an adhesive member bonding the magnetic member to the magnetic coupling member, either one or both of the magnetic member and the magnetic coupling member being provided with an adhesion securing portion configured to secure adhesive strength.

According to a configuration described above, the magnetic member is securely bonded to the magnetic coupling member. The adhesive strength is secured by the adhesion securing portion disposed on either one or both of the magnetic member and the magnetic coupling member. As a result, the magnetic member and the magnetic coupling member are bonded securely together.

In a mounting structure of a magnetic member according to an embodiment of the present invention, the adhesion securing portion is formed to include an uneven portion.

According to a configuration described above, the magnetic member is securely bonded to the magnetic coupling member. Before the magnetic member is mounted onto the magnetic coupling member or after the magnetic member has been mounted onto the magnetic coupling member, the adhesive member applied to either one or both of the adhesion securing portion of the magnetic member and the adhesion securing portion of the magnetic coupling member is spread on the uneven portion making up the adhesion securing portion of the magnetic member or on the uneven portion making up the adhesion securing portion of the magnetic coupling member due to capillarity, thereby realizing secure bonding. Hence the adhesive strength of the magnetic member to the magnetic coupling member is secured without fail.

In a mounting structure of a magnetic member according to an embodiment of the present invention, the adhesion securing portion includes a substantially lattice-shaped uneven portion.

According to a configuration described above, the magnetic member is securely bonded to the magnetic coupling member. Before the magnetic member is mounted onto the magnetic coupling member or after the magnetic member has been mounted onto the magnetic coupling member, the adhesive member applied to either one or both of the adhesion securing portion of the magnetic member and the adhesion securing portion of the magnetic coupling member is spread on the substantially lattice-shaped uneven portion making up the adhesion securing portion of the magnetic member or on the substantially lattice-shaped uneven portion making up the adhesion securing portion of the magnetic coupling member due to the capillarity, thereby realizing secure bonding. Hence the adhesive strength of the magnetic member to the magnetic coupling member is secured without fail.

In a mounting structure of a magnetic member according to an embodiment of the present invention, the adhesion securing portion includes a substantially strip-shaped uneven portion.

According to a configuration described above, the magnetic member is securely bonded to the magnetic coupling member. Before the magnetic member is mounted onto the magnetic coupling member or after the magnetic member has been mounted onto the magnetic coupling member, the adhesive member applied to either one or both of the adhesion securing portion of the magnetic member and the adhesion securing portion of the magnetic coupling member is spread on the substantially strip-like uneven portion making up the adhesion securing portion of the magnetic member or on the substantially strip-like uneven portion making up the adhesion securing portion of the magnetic coupling member due to the capillarity, thereby realizing secure bonding. Hence the adhesive strength of the magnetic member to the magnetic coupling member is secured without fail.

In a mounting structure of a magnetic member according to an embodiment of the present invention, the adhesion securing portion includes a substantially radial uneven portion.

According to a configuration described above, the magnetic member is securely bonded to the magnetic coupling member. Before the magnetic member is mounted onto the magnetic coupling member or after the magnetic member has been mounted onto the magnetic coupling member, the adhesive member applied to either one or both of the adhesion securing portion of the magnetic member and the adhesion securing portion of the magnetic coupling member is spread on the substantially radial uneven portion making up the adhesion securing portion of the magnetic member or on the substantially radial uneven portion making up the adhesion securing portion of the magnetic coupling member due to the capillarity, thereby realizing secure bonding. Hence the adhesive strength of the magnetic member to the magnetic coupling member is secured without fail.

In a mounting structure of a magnetic member according to an embodiment of the present invention, the adhesion securing portion is formed to include an uneven portion whose depth is greater than 0 mm and smaller than or equal to substantially 0.2 mm.

According to a configuration described above, the magnetic member is securely bonded to the magnetic coupling member. Before the magnetic member is mounted onto the magnetic coupling member or after the magnetic member has been mounted onto the magnetic coupling member, the adhesive member applied to either one or both of the adhesion securing portion of the magnetic member and the adhesion securing portion of the magnetic coupling member is easily spread on the uneven portion whose depth is greater than 0 mm and smaller than or equal to substantially 0.2 mm that makes up the adhesion securing portion of the magnetic member or on the uneven portion whose depth is greater than 0 mm and smaller than or equal to substantially 0.2 mm that makes up the adhesion securing portion of the magnetic coupling member due to the capillarity, thereby realizing secure bonding. If the uneven portion formed on either one or both of the adhesion securing portion of the magnetic member and the adhesion securing portion of the magnetic coupling member is 0 mm in depth, for example, there is a fear that the capillarity hardly occurs. If the uneven portion formed on either one or both of the adhesion securing portion of the magnetic member and the adhesion securing portion of the magnetic coupling member is greater than substantially 0.2 mm in depth, for example, there is a fear that the occurrence of the capillarity becomes difficult, for example. When either one or both of the adhesion securing portion of the magnetic member and the adhesion securing portion of the magnetic coupling member include the uneven portion whose depth is greater than 0 mm and smaller than or equal to substantially 0.2 mm, the adhesive member applied to the adhesion securing portion is easily spread on the adhesion securing portion due to the capillarity. Hence the adhesive strength of the magnetic member to the magnetic coupling member is secured without fail.

In a mounting structure of a magnetic member according to an embodiment of the present invention, the adhesion securing portion includes grooves.

According to a configuration described above, the magnetic member is securely bonded to the magnetic coupling member. The adhesive strength is secured by the grooves of the adhesion securing portion disposed on either one or both of the magnetic member and the magnetic coupling member, so that the magnetic member and the magnetic coupling member are securely bonded together.

In a mounting structure of a magnetic member according to an embodiment of the present invention, the adhesion securing portion includes V grooves.

According to a configuration described above, the magnetic member is securely bonded to the magnetic coupling member. The adhesive strength is secured by the V grooves of the adhesion securing portion disposed on either one or both of the magnetic member and the magnetic coupling member, so that the magnetic member and the magnetic coupling member are securely bonded together.

In a mounting structure of a magnetic member according to an embodiment of the present invention, the adhesion securing portion includes grooves in a substantially lattice pattern.

According to a configuration described above, the magnetic member is securely bonded to the magnetic coupling member. The adhesive strength is secured by the grooves in the substantially lattice pattern of the adhesion securing portion disposed on either one or both of the magnetic member and the magnetic coupling member, so that the magnetic member and the magnetic coupling member are securely bonded together.

In a mounting structure of a magnetic member according to an embodiment of the present invention, the adhesion securing portion includes first direction grooves extending substantially along a first direction and second direction grooves extending substantially along a second direction.

According to a configuration described above, the magnetic member is securely bonded to the magnetic coupling member. The adhesion securing portion disposed on either one or both of the magnetic member and the magnetic coupling member includes first direction grooves extending substantially in a first direction and second direction grooves extending substantially in a second direction, thereby securing the adhesive strength, so that the magnetic member and the magnetic coupling member are securely bonded together.

In a mounting structure of a magnetic member according to an embodiment of the present invention, the adhesion securing portion includes grooves extending substantially radially.

According to a configuration described above, the magnetic member is securely bonded to the magnetic coupling member. The adhesion securing portion disposed on either one or both of the magnetic member and the magnetic coupling member includes grooves extending substantially radially, thereby securing the adhesive strength, so that the magnetic member and the magnetic coupling member are securely bonded together.

In a mounting structure of a magnetic member according to an embodiment of the present invention, the adhesion securing portion includes grooves whose depth is greater than 0 mm and smaller than or equal to substantially 0.2 mm.

According to a configuration described above, the magnetic member is securely bonded to the magnetic coupling member. Before the magnetic member is mounted onto the magnetic coupling member or after the magnetic member has been mounted onto the magnetic coupling member, the adhesive member applied to either one or both of the adhesion securing portion of the magnetic member and the adhesion securing portion of the magnetic coupling member is easily spread through the grooves whose depth is greater than 0 mm and smaller than or equal to substantially 0.2 mm that make up the adhesion securing portion of the magnetic member or through the grooves whose depth is greater than 0 mm and smaller than or equal to substantially 0.2 mm that make up the adhesion securing portion of the magnetic coupling member due to the capillarity, thereby realizing secure bonding. If the grooves formed on either one or both of the adhesion securing portion of the magnetic member and the adhesion securing portion of the magnetic coupling member are 0 mm in depth, for example, there is a fear that the capillarity hardly occurs. If the grooves formed on either one or both of the adhesion securing portion of the magnetic member and the adhesion securing portion of the magnetic coupling member are greater than substantially 0.2 mm in depth, for example, there is a fear that the occurrence of the capillarity becomes difficult, for example. When either one or both of the adhesion securing portion of the magnetic member and the adhesion securing portion of the magnetic coupling member include the grooves whose depth is greater than 0 mm and smaller than or equal to substantially 0.2 mm, the adhesive member applied to the adhesion securing portion is easily spread on the adhesion securing portion due to the capillarity. Hence the adhesive strength of the magnetic member to the magnetic coupling member is secured without fail.

In a mounting structure of a magnetic member according to an embodiment of the present invention, the adhesion securing portion includes grooves each having a cross-sectional area greater than 0 $mm^2$ (square millimeter) and smaller than or equal to substantially 0.05 $mm^2$.

According to a configuration described above, the magnetic member is securely bonded to the magnetic coupling member. Before the magnetic member is mounted onto the magnetic coupling member or after the magnetic member has been mounted onto the magnetic coupling member, the adhesive member applied to either one or both of the adhesion securing portion of the magnetic member and the adhesion securing portion of the magnetic coupling member is easily spread through the grooves each having a cross-sectional area greater than 0 $mm^2$ and smaller than or equal to substantially 0.05 $mm^2$ that make up the adhesion securing portion of the magnetic member or through the grooves each having a cross-sectional area greater than 0 $mm^2$ and smaller than or equal to substantially 0.2 $mm^2$ that make up the adhesion securing portion of the magnetic coupling member due to the capillarity, thereby realizing secure bonding. If the grooves formed on either one or both of the adhesion securing portion of the magnetic member and the adhesion securing portion of the magnetic coupling member are 0 $mm^2$ in cross-sectional area, for example, there is a fear that the capillarity hardly occurs. If the grooves formed on either one or both of the adhesion securing portion of the magnetic member and the adhesion securing portion of the magnetic coupling member are greater than 0.05 $mm^2$ in cross-sectional area, for example, there is a fear that the occurrence of the capillarity becomes difficult. When either one or both of the adhesion securing portion of the magnetic member and the adhesion securing portion of the magnetic coupling member is include the grooves each having a cross-sectional area greater than 0 $mm^2$ and smaller than or equal to substantially 0.05 $mm^2$, the adhesive member applied to the adhesion securing portion is easily spread on the adhesion securing portion due to the capillarity. Hence the adhesive strength of the magnetic member to the magnetic coupling member is secured without fail.

In a mounting structure of a magnetic member according to an embodiment of the present invention, an adhesive member reservoir portion configured to lead the adhesive member to the adhesion securing portion is provided on either one or both of the magnetic member and the magnetic coupling member.

According to a configuration described above, the magnetic member is securely bonded to the magnetic coupling member. The adhesive strength is secured by the adhesive member reservoir portion disposed on either one or both of the magnetic member and the magnetic coupling member, so that the magnetic member and the magnetic coupling member are securely bonded together.

In a mounting structure of a magnetic member according to an embodiment of the present invention, the adhesion securing portion is formed to include an uneven portion, the adhesive member reservoir portion is formed to include a dent portion, and the dent portion is located substantially on an upper side with respect to the uneven portion when the adhesive member that joins the magnetic member to the magnetic coupling member is applied to either one or both of the magnetic member and the magnetic coupling member.

According to a configuration described above, the magnetic member is securely bonded to the magnetic coupling member. The adhesive strength is secured by the dent portion of the upper-side adhesive member reservoir portion and the uneven portion of the adhesion securing portion that are provided on either one or both of the magnetic member and the magnetic coupling member, so that the magnetic member and the magnetic coupling member are securely bonded together. For example, the adhesive member is applied to the upper-side adhesive member reservoir portion on either one or both of the magnetic member and the magnetic coupling member, so that the adhesive member is steadily supplied to the uneven portion of the adhesion securing portion due to gravity and/or the capillarity. Thus, it becomes easy for the adhesive member to be spread on the adhesive securing portion.

In a mounting structure of a magnetic member according to an embodiment of the present invention, the adhesion securing portion includes grooves, the adhesive member reservoir portion includes a dent portion, and the grooves and the dent portion are substantially the same in depth.

According to a configuration described above, the magnetic member is securely bonded to the magnetic coupling member. The adhesive strength is secured by the dent portion of the adhesive member reservoir portion and the grooves of the adhesion securing portion that are provided on either one or both of the magnetic member and the magnetic coupling member, so that the magnetic member and the magnetic coupling member are securely bonded together. For example, the adhesive member is applied to the adhesive member reservoir portion on either one or both of the magnetic member and the magnetic coupling member, so that the adhesive member is steadily supplied to the grooves of the adhesion securing portion, thereby being easily spread on the adhesive securing unit In a mounting structure of a magnetic member according to an embodiment of the present invention, the adhesive member reservoir portion includes a dent portion whose depth is greater than 0 mm and smaller than or equal to substantially 0.2 mm.

According to a configuration described above, the magnetic member is securely bonded to the magnetic coupling member. Before the magnetic member is mounted onto the magnetic coupling member or after the magnetic member has been mounted onto the magnetic coupling member, the adhesive member applied to either one or both of the adhesive member reservoir portion of the magnetic member and the adhesive member reservoir portion of the magnetic coupling member is easily spread through the dent portion whose depth is greater than 0 mm and smaller than or equal to substantially 0.2 mm that make up the adhesive member reservoir portion of the magnetic member or through the dent portion whose depth is greater than 0 mm and smaller than or equal to substantially 0.2 mm that make up the adhesive member reservoir portion of the magnetic coupling member due to the capillarity, etc., and thus, secure bonding is realized. If the dent portion provided on either one or both of the adhesive member reservoir portion of the magnetic member and the adhesive member reservoir portion of the magnetic coupling member are 0 mm in depth, for example, there is a fear that the capillarity, etc., hardly occurs. If the dent portion formed on either one or both of the adhesive member reservoir portion of the magnetic member and the adhesive member reservoir portion of the magnetic coupling member are greater than 0.2 mm in depth, for example, there is a fear that the occurrence of the capillarity, etc., becomes difficult. When either one or both of the adhesive member reservoir portion of the magnetic member and the adhesive member reservoir portion of the magnetic coupling member include the dent portion whose depth is greater than 0 mm and smaller than or equal to substantially 0.2 mm, the adhesive member applied to the adhesive member reservoir portion is easily spread, from the adhesive member reservoir portion as a starting point, on the adhesion securing portion due to the capillarity, etc. Hence the adhesive strength of the magnetic member to the magnetic coupling member is secured without fail.

A pickup unit according to an embodiment of the present invention includes any of the above described mounting structures of the magnetic member.

According to a configuration described above, it becomes possible to make up the pickup unit in which the magnetic member is securely bonded to the magnetic coupling member. The adhesive strength is secured by the adhesion securing portion disposed on either one or both of the magnetic member and the magnetic coupling member, so that the pickup unit is made up in which the magnetic member and the magnetic coupling member are securely bonded together.

A method of bonding a magnetic member and a magnetic coupling member according to an embodiment of the present invention includes forming an adhesion securing portion configured to secure adhesive strength on either one or both of the magnetic member and the magnetic coupling member, and bonding the magnetic member to the magnetic coupling member.

According to a configuration described above, the magnetic member is securely bonded to the magnetic coupling member. The adhesion securing portion securing adhesive strength is formed on either one or both of the magnetic member and the magnetic coupling member, and the adhesive member is provided on the adhesion securing portion formed on either one or both of the magnetic member and the magnetic coupling member, and thus the adhesive strength is secured, so that the magnetic member and the magnetic coupling member are securely bonded together.

In the method of bonding a magnetic member and a magnetic coupling member according to an embodiment of the present invention, the adhesion securing portion is formed with a metal mold.

According to a configuration described above, the magnetic member is securely bonded to the magnetic coupling member. Either one or both of the magnetic member and the magnetic coupling member is subjected to transfer processing, using a metal mold, to form the adhesion securing portion thereon, and the adhesive strength is secured by either one or both of the adhesion securing portion formed on the magnetic member by the transfer processing and the adhesion securing portion formed on the magnetic coupling member by the transfer processing. As a result, the magnetic member and the magnetic coupling member are securely bonded together.

In the method of bonding a magnetic member and a magnetic coupling member according to an embodiment of the present invention, the adhesion securing portion is formed by performing presswork.

According to a configuration described above, the magnetic member is securely bonded to the magnetic coupling member. Either one or both of the magnetic member and the magnetic coupling member is subjected to presswork to form the adhesion securing portion thereon, and the adhesive strength is secured by either one or both of the adhesion securing portion formed on the magnetic member by the presswork and the adhesion securing portion formed on the magnetic coupling member by the presswork. As a result, the magnetic member and the magnetic coupling member are securely bonded together.

In the method of bonding a magnetic member and a magnetic coupling member according to an embodiment of the present invention, the adhesion securing portion is formed by performing transfer processing.

According to a configuration described above, the magnetic member is securely bonded to the magnetic coupling member. Either or both of the magnetic member and the magnetic coupling member is subjected to transfer processing to form the adhesion securing portion thereon, and the adhesive strength is secured by either one or both of the adhesion securing portion formed on the magnetic member by the transfer processing and the adhesion securing portion formed on the magnetic coupling member by the transfer processing. Asa result, the magnetic member and the magnetic coupling member are securely bonded together.

A pickup unit according to an embodiment of the present invention is configured by performing any of the above described methods of bonding the magnetic member and the magnetic coupling member.

According to a configuration described above, it becomes possible to make up the pickup unit in which the magnetic member is securely bonded to the magnetic coupling member. The adhesion securing portion for securing adhesive strength is formed on either one or both of the magnetic member and the magnetic coupling member, and the adhesive member is provided on the adhesion securing portion formed on either one or both of the magnetic member and the magnetic coupling member. Thus, the adhesive strength is secured, so that it becomes possible to make up the pickup unit in which the magnetic member and the magnetic coupling member are securely bonded together.

A disc apparatus according to an embodiment of the present invention includes the above described pickup unit.

According to a configuration described above, it becomes possible to make up the disc apparatus including the pickup unit in which the magnetic member is securely bonded to the magnetic coupling member.

Hereinafter, description will be made in detail of a mounting structure of a magnetic member, a method of bonding a magnetic member and a magnetic coupling member, a pickup unit, and a disc apparatus according to an embodiment of the present invention with reference to the accompanying drawings.

<First Embodiment>

FIGS. 1 to 5 illustrate a first embodiment of a mounting structure of a magnetic member, a method of bonding a magnetic member and a magnetic coupling member, a pickup unit, and a disc apparatus according to the present invention.

Figure 4:
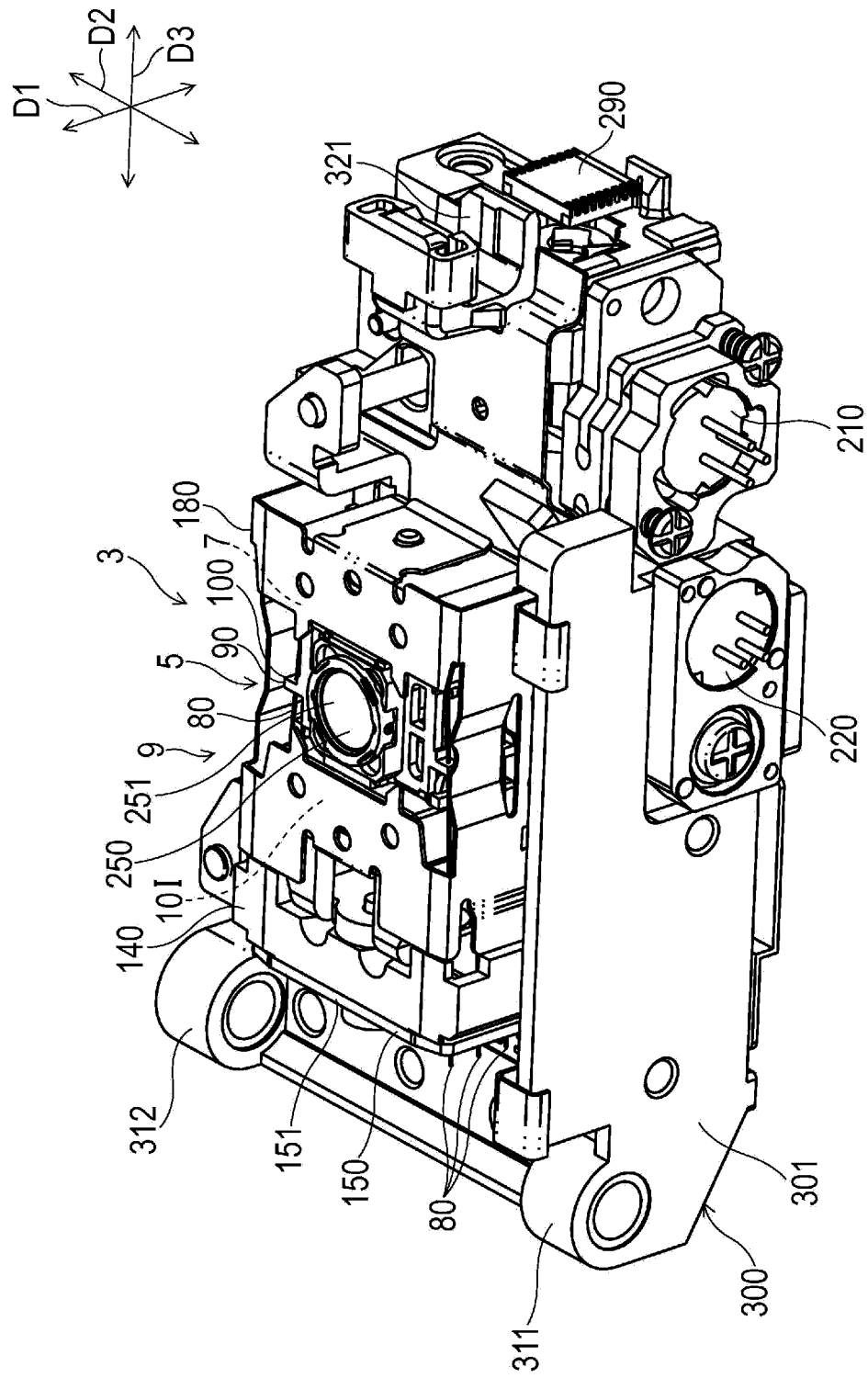
FIG. 4 is a perspective view of a pickup unit according to a first embodiment of the present invention.

A magnetic coupling member 10I (FIGS. 1, 2A, 2B) and a magnetic member 50 (FIG. 2A) make up a fixed portion 7 of a driver 5 (FIG. 4). As illustrated in FIG. 4, coils (not shown) corresponding to an objective lens 250, a holding member 90, and the magnetic member 50 (FIG. 2A); a movable portion assembly 100 made up by mounting the objective lens 250, oils not shown, etc., to the holding member 90 (FIG. 4); and support members 80 for supporting the movable portion assembly 100 make up a movable portion 9 of the driver 5. The driver 5 for the objective lens 250 of the pickup unit 3 is configured, for example, as the actuator 5 including the fixed portion 7 and the movable portion 9.

Figure 5:
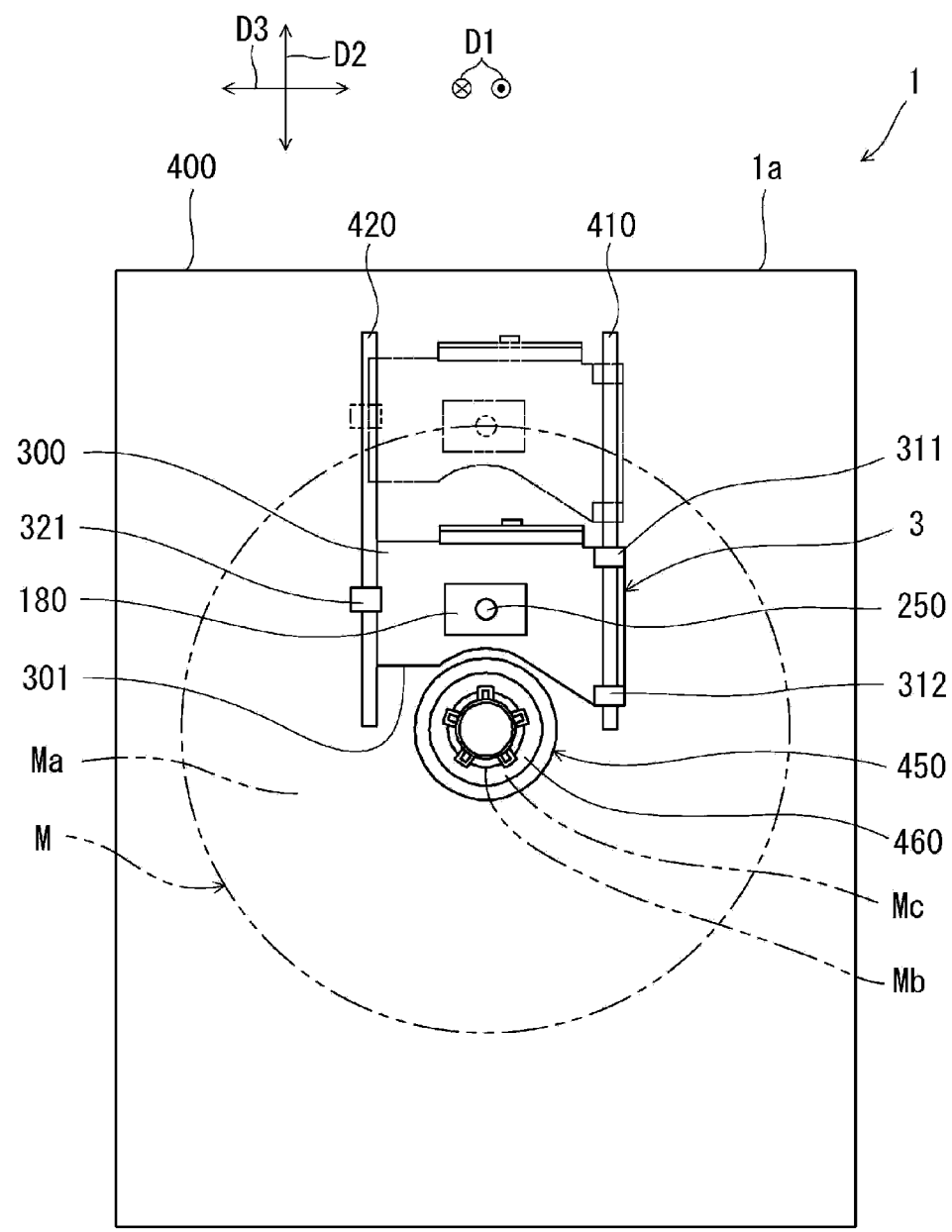
FIG. 5 is an explanatory diagram of a disc apparatus according to a first embodiment of the present invention.

As the pickup unit 3 illustrated in FIGS. 4 and 5, the optical pickup unit 3 capable of emitting laser light (LASER: light amplification by stimulated emission of radiation) is used, for example. The optical pickup or optical pickup unit is abbreviated as "OPU", for example. As the disc apparatus 1 shown in FIG. 5, the optical disc apparatus 1 capable of emitting laser light is used, for example. The objective lens is abbreviated as "OBL", for example. The movable portion assembly 100 made up by mounting the OBL 250, coils not shown, etc., to the holding member 90, i.e., lens holder 90 is provided as the lens holder assembly 100, for example.

The OPU 3 shown in FIGS. 4 and 5 supports various media M such as a disc M (FIG. 5). The disc M includes an optical disc M, for example. The OPU 3 reproduces data, information, signals, etc., recorded in the various media M such as the optical disc M (FIG. 5). The OPU 3 also records data, information, signals, images, etc., in the various media M such as a writable or rewritable optical disc M. Since the OPU 3 supports the various media M such as the optical discs M capable of deletion of data, information, signals, etc., the OPU 3 deletes data, information, signals, etc., recorded in the various media M such as the optical disc M. Media mean discs or the like having data, information, signals, etc., stored therein for example.

The OPU 3 supports media of the "CD" (Compact Disc: trademark) category, media of the "DVD" (Digital Versatile Disc: trademark) category, media of the "HD DVD" (High Definition DVD: registered trademark) category, media of "CBHD" (China Blue High-Definition)(e.g., former name: "CH-DVD") category that is the media based on a standard established in China, and media of the "Blu-ray Disc" (registered trademark) category, for example. The OPU 3 supports at least one medium selected from a group of these media. Specifically, the OPU 3 supports anyone of these media, for example.

The above various types of optical disc M, etc., are included in the media M, however, the following discs (M) are also included in the media M. For example, the disc (M) includes an optical disc (M) that has signal surfaces (Ma) provided on both disc faces thereof and is capable of data writing, deleting, rewriting, etc. The disc (M) also includes an optical disc (M) that has a double-layer signal surface (Ma) and is capable of data writing, deleting, rewriting, etc. In this specification, a parenthesis ( ) which parenthesizes a sign therein is used for convenience's sake to explain an element slightly different from an element illustrated in the drawings, etc. An optical disc for "HD DVD" (not shown) is further included that has a three-layer signal surface and is capable of data writing, deleting, rewriting, etc., and an optical disc for "Blu-ray Disc" (not shown) that has a four-layer signal surface and is capable of data writing, deleting, rewriting, etc. An optical disc (M) capable of various types of writing including label writing by emitting laser light on a label surface of the optical disc (M) is further included, for example. The signal surface Ma and the label surface of the optical disc M includes a thin layer, etc., such as a metal thin film, for example. Data, information, signals, etc., are recorded on the signal surface Ma including the metal thin film, etc., while images are recorded on the label surface. The signal surface Ma of the optical disc M is configured as the signal layer Ma including the metal thin layer, etc., for example.

A light-emitting element 210 is supplied with a current to emit laser light, which is used for recording information in the optical disc M, reproducing information recorded in the optical disc M, and deleting information recorded in the optical disc M. A light-emitting element 220 is supplied with a current to emit laser light, which is used for recording information in the optical disc M, reproducing information recorded in the optical disc M, and deleting information recorded in the optical disc M.

The OBL 250 of the OPU 3 is moved upward/downward and leftward/rightward, using the actuator 5 of the OPU 3, to focus laser light on the signal layer Ma of the optical disc M. When a highly precise laser spot is formed by irradiation on the signal layer Ma of the optical disc M, the OBL 250 held by the lens holder 90 is moved by the actuator 5 of the OPU 3 substantially in a focusing direction D1, a tracking direction D2, etc. When the OBL 250 performs laser light focusing, the OPU 3 performs focusing adjustment, tracking adjustment, and tilt adjustment, when necessary. Focusing adjustment, tracking adjustment, and tilt adjustment are performed substantially at the same time, for example.

Focus means focal point or a focal point of a lens. Focusing means bringing into focus or being brought into focus. A track means, for example, the track of a signal in an optical disc. Tracking means tracking and observing a micro signal portion formed on the signal surface of the optical disc, using light, to determine the position of a substantially spirally track. A tilt on the optical disc apparatus or the optical pickup unit means a deviation of an angle between the disc surface and the optical axis of the objective lens. For example, when a focus servo operation of the lens holder assembly 100 including the lens holder 90 fitted with the OBL 250 is performed for the optical disc M, the lens holder assembly 100 including the lens holder 90 fitted with the OBL 250 is moved along the upward/downward direction D1. when tracking servo operation of the lens holder assembly 100 including the lens holder 90 fitted with the OBL 250 is performed for the optical disc M, the lens holder assembly 100 including the lens holder 90 fitted with the OBL 250 is moved along the leftward/rightward direction D2. A servo or a servo mechanism means a mechanism that measures a state of an object to be controlled and that compares the measured state with a reference value to perform automatic correction control for the object. When laser light is condensed by the OBL 250 to be focused on the signal layer Ma of the optical disc M, the lens holder assembly 100 including the lens holder 90 fitted with the OBL 250 is driven by the actuator 5 to be moved upward/downward and leftward/rightward.

Figure 2A:
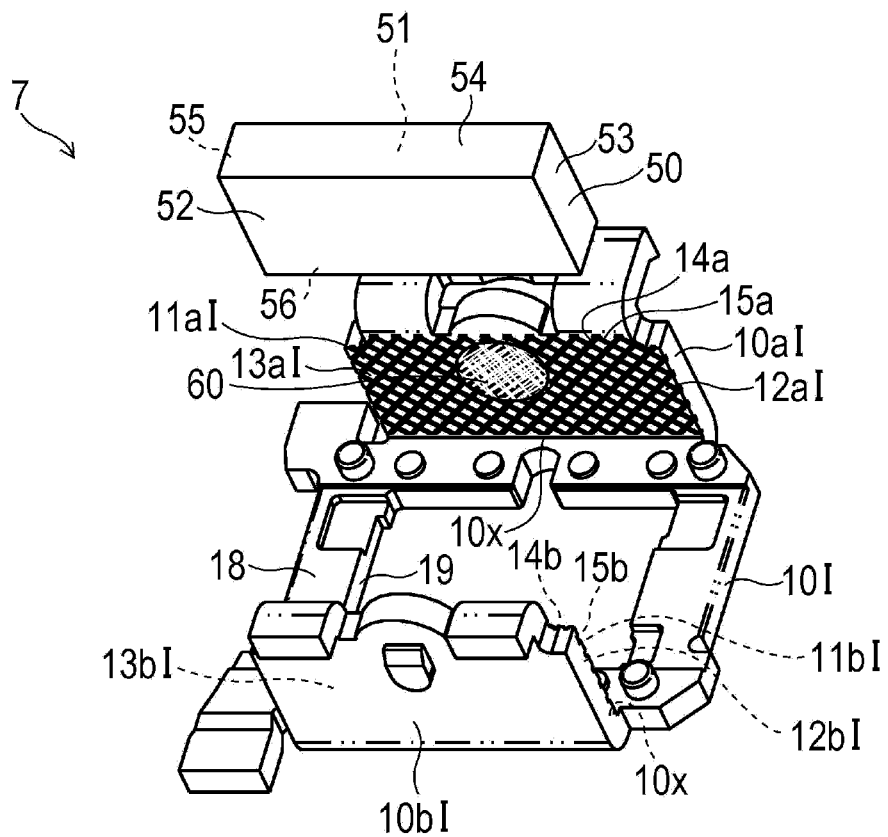
FIG. 2A is an exploded perspective view of a mounting structure of a magnetic member and a method of bonding the magnetic member and a magnetic coupling member according to a first embodiment of the present invention.
Figure 2B:
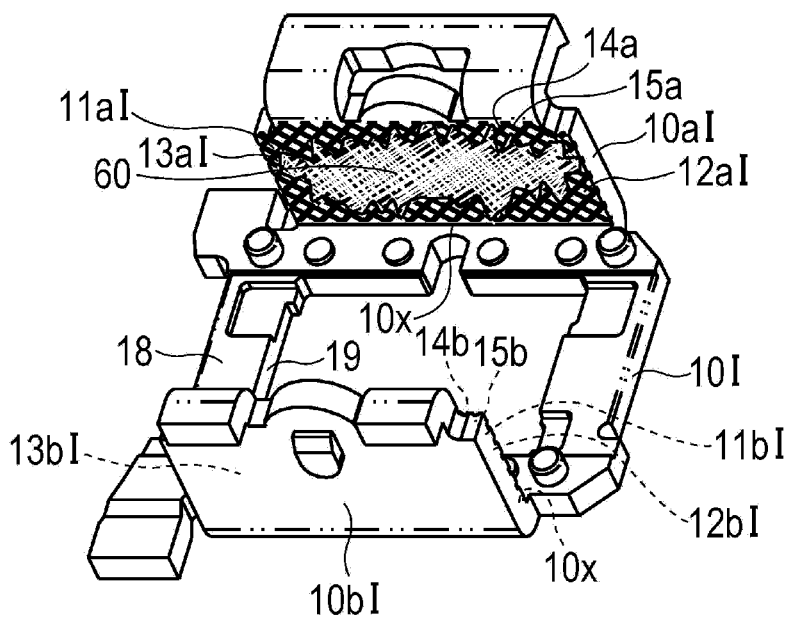
FIG. 2B is an explanatory diagram of a mounting structure of a magnetic member and a method of bonding the magnetic member and a magnetic coupling member according to a first embodiment of the present invention.

The mounting structure of the magnetic member 50 of FIGS. 1, 2A, and 2B, i.e., the mounting structure of the magnet 50 includes a pair of the substantially rectangular plate-like magnets 50, the magnetic coupling member 10I, i.e., yoke 10I of a substantially U shape, for example, provided with the pair of substantially rectangular plate-like magnets 50, and an adhesive member 60, i.e., adhesive 60 with which the pair of substantially rectangular plate-like magnets 50 are bonded/joined to the substantially U-shaped yoke 10I. A yoke means a member that structurally supports a magnetic coupling, for example, and the yoke reduces a leak of a magnetic force generated from a magnetic member such as a magnet. Here, the yoke 10I is employed as the back yoke 10I provided with the magnets 50. For example, the back yoke 10I may be handled as the frame yoke 10I. A frame means a framework or skeleton, for example. The frame yoke is formed as the frame having a function of the yoke. Adhesion securing portions 12aI and 12bI that secure the adhesive strength of the adhesive 60 when the magnets 50 are mounted on the back yoke 10I are disposed on either one or both of substantially rectangular plane mounting surfaces 51 making up the magnets 50 and a pair of substantially rectangular plane mounting surfaces 11aI and 11bI making up the back yoke 10I.

The mounting structure of the magnet 50 of FIGS. 1, 2A, and 2B will be described specifically. The mounting structure of the magnet 50 includes the pair of the substantially rectangular plate-like magnets 50, the substantially U-shaped back yoke 10I provided with the pair of adhesion securing portions 12aI and 12bI that secure adhesive strength when the pair of the substantially rectangular plate-like magnets 50 are bonded to the back yoke 10I, and the adhesive 60 with which the pair of substantially rectangular plate-like magnets 50 are bonded/joined to the substantially U-shaped yoke 10I.

The substantially U-shaped back yoke 10I includes a base wall 18 formed into a substantially hollow rectangular plate-like shape and a pair of side walls 10aI and 10bI extending along a direction substantially orthogonal to the base wall 18. The substantially rectangular mounting surface 11aI serving as the adhesive surface of the first side wall 10aI making up the back yoke 10I is provide with the adhesion securing portion 12aI that secures the adhesive strength of the adhesive 60. The substantially rectangular mounting surface 11bI serving as the adhesive surface of the second side wall 10bI making up the back yoke 10I is provide with the adhesion securing portion 12bI that secures the adhesive strength of the adhesive 60. The substantially rectangular base wall 18 making up the back yoke 10I has a substantially rectangular through hole 19 through which laser light passes.

The substantially rectangular plate-like magnet 50 includes the substantially rectangular mounting surface 51 serving as the adhesive surface, a substantially rectangular coil facing surface 52 serving as a coil facing surface opposite to the mounting surface 51, and four substantially oblong end faces 53, 54, 55, and 56 substantially orthogonal to the substantially rectangular mounting surface 51 and to the substantially rectangular coil facing surface 52. As such, the substantially rectangular plate-like magnet 50 is formed into a substantially flat rectangular parallelepiped including at least six faces 51, 52, 53, 54, 55, and 56.

The adhesion securing portions 12aI and 12bI are disposed on the mounting surfaces 11aI and 11bI of the side walls 10aI and 10bI making up the back yoke 10I, as illustrated in FIGS. 1, 2A, and 2B, however, adhesion securing portions (not shown) may be disposed on the mounting surfaces 51 making up the magnets 50, for example, depending on the mounting structure of the magnet 50, the design/specification of the OPU 3, the method of bonding the magnet 50 and the yoke 10I, etc.

The adhesive 60 is provided on the mounting surfaces 11aI and 11bI making up the back yoke 10I to bond the magnets 50 to the back yoke 10I, as illustrated in FIGS. 1, 2A, and 2B, however, the adhesive 60 may be provided on the mounting surfaces 51 making up the magnets 50 to bond the magnets 50 to the back yoke 10I, for example, depending on the mounting structure of the magnet 50, the design/specification of the OPU 3, the method of bonding the magnet 50 and the yoke 10I, etc.

Since the mounting structure of the magnet 50 of FIGS. 1, 2A, and 2B is made up, for example, the pair of substantially rectangular plate-like magnets 50 are securely bonded to the substantially rectangular plane mounting surfaces 11aI and 11bI making up the back yoke 10I. Due to the adhesion securing portions 12aI and 12bI provided on either one or both of the mounting surfaces 51 making up the magnets 50 and the mounting surfaces 11aI and 11bI making up the back yoke 10I, the magnets 50 and the back yoke 10I are securely bonded together in a state where the adhesive strength of the adhesive 60 is secured. Specifically, due to the adhesion securing portions 12aI and 12bI disposed on the mounting surfaces 11aI and 11bI making up the back yoke 10I, the magnets 50 are securely bonded to the back yoke 10I in a state where the adhesive strength of the adhesive 60 is secured.

The adhesion securing portions 12aI and 12bI include a plurality of fine uneven portions 13aI and 13bI. The uneven portion represents a surface having dent portions such as grooves or recessions, for example, in an expression for convenience.

If the adhesion securing portions 12aI and 12bI are formed illustrated in FIGS. 1, 2A, and 2B, for example, the magnets 50 are securely bonded to the back yoke 10I. Before the magnets 50 are mounted on the back yoke 10I or after the magnets 50 have been mounted on the back yoke 10I, the adhesive 60 applied to either one or both of the adhesion securing portions of the mounting surfaces 51 making up the magnets 50 and the adhesion securing portions 12aI and 12bI of the mounting surfaces 11aI and 11bI making up the back yoke 10I is easily spread on the plurality of fine uneven portions making up the adhesion securing portions of the mounting surfaces 51 of the magnets 50 or on the plurality of fine uneven portions 13aI and 13bI making up the adhesion securing portions 12aI and 12bI of the mounting surfaces 11aI and 11bI of the back yoke 10I, due to capillarity, thereby realizing secure surface bonding. Thus the adhesive strength of the magnets 50 to the back yoke 10I is secured without fail.

For example, when the adhesive 60 is applied in advance to either one or both of the plurality of fine uneven portions of the mounting surfaces 51 making up the magnets 50 and the plurality of fine uneven portions 13aI and 13bI of the mounting surfaces 11aI and 11bI making up the back yoke 10I, and then the magnets 50 are provided on the back yoke 10I, a paddle-like action of the magnets 50 for the back yoke 10I occurs, thereby scraping off the adhesive 60, for example. Even if the paddle-like scraping off action of the magnets 50 for the adhesive 60 occurs, for example, the plurality of fine uneven portions 13aI and 13bI serve as adhesive reservoirs, for example, and thus, the amount of the adhesive 60 is limited that is scraped away by the magnets 50 from the plurality of fine uneven portions 13aI and 13bI. As a result, the adhesive 60 remains in a wide area on either one or both of the mounting surfaces 51 making up the magnets 50 and the mounting surfaces 11$a$I and 11$b$I making up the back yoke 10I. Therefore, the adhesive strength of the magnets 50 to the back yoke 10I is secured without fail.

When the magnets 50 are bonded to the back yoke 10I, for example, in a case where the adhesive 60 is applied and spread in advance substantially uniformly on either one or both of the plurality of fine uneven portions of the mounting surfaces 51 making up the magnets 50 and the plurality of fine uneven portions 13$a$I and 13$b$I of the mounting surfaces 11$a$I and 11$b$I making up the back yoke 10I or in a case where the mounting surfaces 51 making up the magnets 50 are provided in the vicinity of the mounting surfaces 11$a$I and 11$b$I making up the back yoke 10I and immediately thereafter, the adhesive 60 is applied in a substantially dotted manner to either one or both of the plurality of fine uneven portions of the mounting surfaces 51 making up the magnets 50 and the plurality of fine uneven portions 13$a$I and 13$b$I of the mounting surfaces 11$a$I and 11$b$I making up the back yoke 10I, the adhesive 60 spreads on the plurality of fine uneven portions 13$a$I and 13$b$I due to the capillarity. Therefore, the stable adhesive strength of the magnets 50 to the back yoke 10I is secured.

The adhesion securing portions 12$a$I and 12$b$I include the plurality of fine uneven portions 13$a$I and 13$b$I having a substantially rectangular inclined lattice shape or a substantially inclined strip shape, for example.

If the adhesion securing portions 12$a$I and 12$b$I is formed as such, the magnets 50 are securely bonded to the back yoke 10I. Before the magnets 50 are mounted on the back yoke 10I or after the magnets 50 have been mounted on the back yoke 10I, the adhesive 60 applied to either one or both of the adhesion securing portions of the mounting surfaces 51 making up the magnets 50 and the adhesion securing portions 12$a$I and 12$b$I of the mounting surfaces 11$a$I and 11$b$I making up the back yoke 10I is easily spread on the plurality of fine uneven portions, in a substantially rectangular inclined lattice shape or a substantially inclined strip-like for example, making up the adhesion securing portions of the mounting surfaces 51 of the magnets 50 or on the plurality of fine uneven portions 13$a$I and 13$b$I, in the substantially rectangular inclined lattice shape or the substantially inclined strip-like shape, for example, making up the adhesion securing portions 12$a$I and 12$b$I of the mounting surfaces 11$a$I and 11$b$I of the back yoke 10I, due to capillarity, thereby realizing secure surface bonding. Thus the adhesive strength of the magnets 50 to the back yoke 10I is secured without fail.

The adhesion securing portions 12$a$I and 12$b$I may not be made up of the plurality of fine uneven portions 13$a$I and 13$b$I, in the substantially rectangular inclined lattice shape or the substantially inclined strip shape, for example, but may be made up of a plurality of fine uneven portions in a discontinuous arbitrary shape (not shown), for example, depending on the mounting structure of the magnet 50, the design/specification of the OPU 3, the method of bonding the magnet 50 and the yoke 10I, etc. For example, the adhesion securing portions 12$a$I and 12$b$I may be made up of a plurality of fine uneven portions in a substantially corrugated shape (not shown), for example.

Figure 3A:
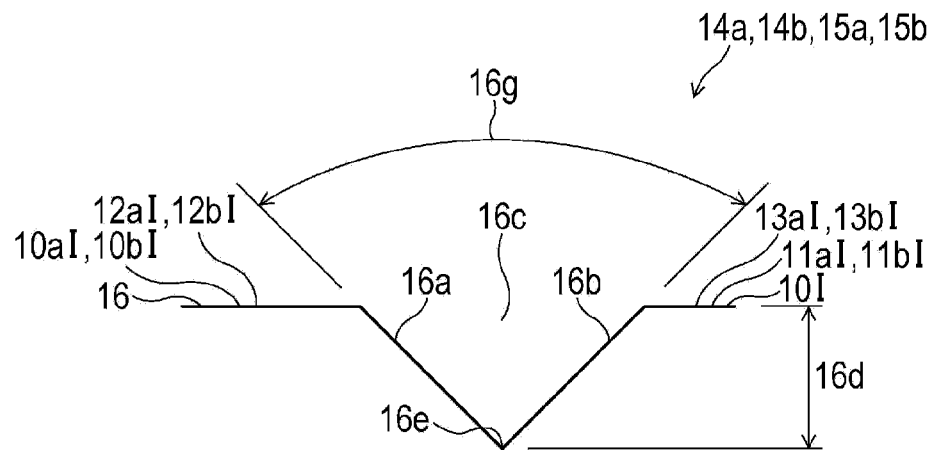
FIG. 3A is an explanatory diagram of a groove of an uneven portion of an adhesion securing portion.

The adhesion securing portions 12$a$I and 12$b$I include the uneven portions 13$a$I and 13$b$I including a plurality of fine grooves 14$a$, 14$b$, 15$a$, and 15$b$ whose depth 16$d$ (FIG. 3) is greater than 0 mm and smaller than or equal to substantially 0.2 mm. As illustrated in FIG. 3, the grooves 14$a$, 14$b$, 15$a$, and 15$b$ are formed as the V grooves 14$a$, 14$b$, 15$a$, and 15$b$ of a substantially V-shaped longitudinal section with the predetermined depth of 16$d$, which can be molded with ease and precision by presswork, etc. Specifically, assuming that the side walls 10$a$I/10$b$I having the grooves 14$a$, 14$b$/15$a$, 15$b$ are cut substantially along a direction substantially orthogonal to the longitudinal direction of the elongate grooves 14$a$, 14$b$/15$a$, 15$b$, for example, the depth 16$d$ of each of the V grooves 14$a$, 14$b$, 15$a$, and 15$b$ in a longitudinal sectional view is set at a value greater than 0 mm and smaller than or equal to substantially 0.2 mm.

With this configuration, the magnets 50 are securely bonded to the back yoke 10I. Before the magnets 50 are mounted on the back yoke 10I or after the magnets 50 have been mounted on the back yoke 10I, the adhesive 60 applied to either one or both of the adhesion securing portions of the mounting surfaces 51 making up the magnets 50 and the adhesion securing portions 12$a$I and 12$b$I of the mounting surfaces 11$a$I and 11$b$I making up the back yoke 10I, is easily spread on the plurality of uneven portions having the fine V grooves whose depth is greater than 0 mm and smaller than or equal to substantially 0.2 mm that make up the adhesion securing portions of the mounting surfaces 51 of the magnets 50 or on the uneven portions 13$a$I and 13$b$I having the fine V grooves 14$a$, 14$b$, 15$a$, and 15$b$ whose depth 16$d$ is greater than 0 mm and smaller than or equal to substantially 0.2 mm that make up the adhesion securing portions 12$a$I and 12$b$I of the mounting surfaces 11$a$I and 11$b$I of the back yoke 10I, due to capillarity caused by the grooves 14$a$, 14$b$, 15$a$, and 15$b$, etc., thereby realizing secure surface bonding.

If the depth 16$d$ of the V-shaped grooves 14$a$, 14$b$, 15$a$, and 15$b$ of the uneven portions 13$a$I and 13$b$I formed on either one or both of the adhesion securing portions of the magnets 50 and the adhesion securing portions 12$a$I and 12$b$I of the back yoke 10I is set at 0 mm, for example, there is a fear that the capillarity hardly occurs. If the depth 16$d$ of the V-shaped grooves 14$a$, 14$b$, 15$a$, and 15$b$ of the uneven portions 13$a$I and 13$b$I formed on either one or both of the adhesion securing portions of the magnets 50 and the adhesion securing portions 12$a$I and 12$b$I of the back yoke 10I is set at a value greater than substantially 0.2 mm, for example, there is a fear that the occurrence of the capillarity becomes difficult. There is also another fear that the V grooves 14$a$, 14$b$, 15$a$, and 15$b$ making up the uneven portions 13$a$I and 13$b$I cannot be molded with ease and precision. When either one or both of the adhesion securing portions of the magnets 50 and the adhesion securing portions 12$a$I and 12$b$I of the back yoke 10I are made up of the uneven portions 13$a$I and 13$b$I having the V grooves 14$a$, 14$b$, 15$a$, and 15$b$ whose depth 16$d$ is greater than 0 mm and smaller than or equal to substantially 0.2 mm, the adhesive 60 applied to the adhesion securing portions 12$a$I and 12$b$I easily spreads on the adhesion securing portions 12$a$I and 12$b$I due to the capillarity. Thus the adhesive strength of the magnets 50 to the back yoke 10I is secured without fail.

The uneven portions 13$a$I and 13$b$I having the plurality of fine V grooves 14$a$, 14$b$, 15$a$, and 15$b$ with the depth 16$d$ of substantially several μm (micron/micrometer) to substantially 0.2 mm, preferably, substantially 0.01 mm or greater to substantially 0.15 mm or smaller are formed, as the adhesion securing portions 12$a$I and 12$b$I, on either one or both of the mounting surfaces 51 making up the magnets 50 and the mounting surfaces 11$a$I and 11$b$I making up the back yoke 10I, and thus, the adhesive strength of the magnets 50 to the back yoke 10I is secured without fail due to the capillarity, etc., of the adhesive 60.

If the depth 16$d$ of the V grooves 14$a$, 14$b$, 15$a$, and 15$b$ of the uneven portions 13$a$I and 13$b$I provided on either one or both of the adhesion securing portions of the magnets 50 and the adhesion securing portions 12$a$I and 12$b$I of the back yoke 10I is set at less than substantially 0.01 mm, for example, there is a fear that the capillarity hardly occurs. If the depth 16d of the V grooves 14a, 14b, 15a, and 15b of the uneven portions 13aI and 13bI provided on either one or both of the adhesion securing portions of the magnets 50 and the adhesion securing portions 12aI and 12bI of the back yoke 10I is set at a value greater than substantially 0.15 mm, for example, there is a fear that the occurrence of the capillarity becomes difficult. There is also another fear that the V grooves 14a, 14b, 15a, and 15b making up the uneven portions 13aI and 13bI cannot be molded with ease and precision. When either one or both of the adhesion securing portions of the magnets 50 and the adhesion securing portions 12aI and 12bI of the back yoke 10I are made up of the uneven portions 13aI and 13bI having the V grooves 14a, 14b, 15a, and 15b whose depth 16d is substantially 0.01 mm or greater and smaller than or equal to substantially 0.15 mm, the adhesive 60 applied to the adhesion securing portions 12aI and 12bI is easily spreads on the adhesion securing portions 12aI and 12bI, due to the capillarity. Thus the adhesive strength of the magnets 50 to the back yoke 10I is secured without fail.

Figure 3B:
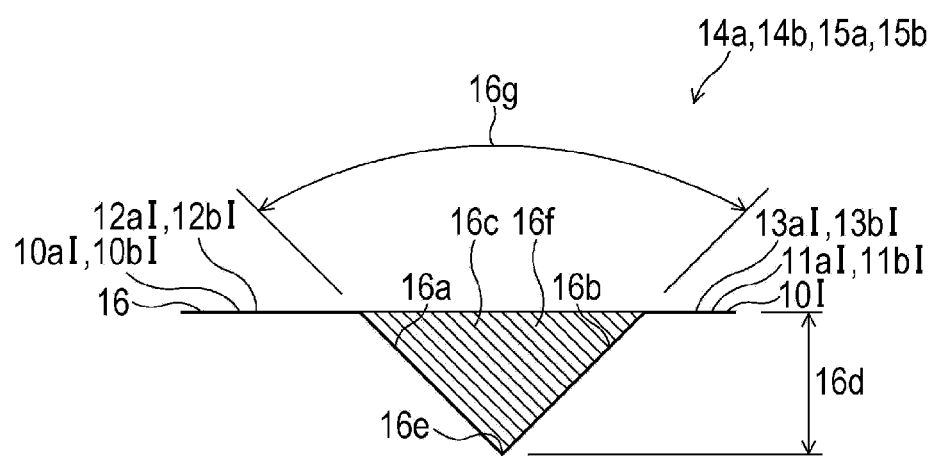
FIG. 3B is an explanatory diagram of a groove of an uneven portion of an adhesion securing portion.

The adhesion securing portions 12aI and 12bI include the uneven portions 13aI and 13bI having the plurality of fine grooves 14a, 14b, 15a, and 15b each having a cross-sectional area 16f (FIG. 3B) greater than 0 mm$^2$ (square millimeter) and smaller than or equal to substantially 0.05 mm$^2$. As illustrated in FIG. 3B, the grooves 14a, 14b, 15a, and 15b are formed as the V grooves 14a, 14b, 15a, and 15b having a V-shaped longitudinal section with the predetermined cross-sectional area 16f that can be molded with ease and precision by presswork, etc., for example. Specifically, assuming that the side walls 10aI/10bI having the grooves 14a, 14b/15a, 15b are cut substantially along a direction substantially orthogonal to the longitudinal direction of the elongate grooves 14a, 14b/15a, 15b, the cross-sectional area 16f of each of the V grooves 14a, 14b, 15a, and 15b in a longitudinal cross-sectional view is set at a value greater than 0 mm$^2$ and smaller than or equal to substantially 0.05 mm$^2$, for example.

With this configuration, the magnets 50 are securely bonded to the back yoke 10I. Before the magnets 50 are mounted on the back yoke 10I or after the magnets 50 have been mounted on the back yoke 10I, the adhesive 60 applied to either one or both of the adhesion securing portions of the mounting surfaces 51 making up the magnets 50 and the adhesion securing portions 12aI and 12bI of the mounting surfaces 11aI and 11bI making up the back yoke 10I is easily spread on the uneven portions having the fine V grooves each having a cross-sectional area greater than 0 mm$^2$ and smaller than or equal to substantially 0.05 mm$^2$ that make up the adhesion securing portions of the mounting surfaces 51 of the magnets 50 or on the uneven portions 13aI and 13bI having the fine V grooves 14a, 14b, 15a, and 15b each having a cross-sectional area 16f greater than 0 mm$^2$ and smaller than or equal to substantially 0.05 mm$^2$ that make up the adhesion securing portions 12aI and 12bI of the mounting surfaces 11aI and 11bI of the back yoke 10I, due to the capillarity caused by the grooves 14a, 14b, 15a, and 15b, etc., for example, thereby realizing secure surface bonding.

If the cross-sectional area 16f of the V grooves 14a, 14b, 15a, and 15b of the uneven portions 13aI and 13bI provided on either one or both of the adhesion securing portions of the magnets 50 and the adhesion securing portions 12aI and 12bI of the back yoke 10I is set at 0 mm$^2$, for example, there is a fear that the capillarity hardly occurs. If the cross-sectional area 16f of the V grooves 14a, 14b, 15a, and 15b of the uneven portions 13aI and 13bI provided on either one or both of the adhesion securing portions of the magnets 50 and the adhesion securing portions 12aI and 12bI of the back yoke 10I is set at a value greater than substantially 0.05 mm$^2$, for example, there is a fear that the occurrence of the capillarity becomes difficult. Either one or both of the adhesion securing portions of the magnets 50 and the adhesion securing portions 12aI and 12bI of the back yoke 10I are made up of the uneven portions 13aI and 13bI having the V grooves 14a, 14b, 15a, and 15b each having a cross-sectional area 16f greater than 0 mm$^2$ and smaller than or equal to substantially 0.05 mm$^2$, and thus, the adhesive 60 applied to the adhesion securing portions 12aI and 12bI is easily spread on the adhesion securing portions 12aI and 12bI, due to the capillarity. Therefore, the adhesive strength of the magnets 50 to the back yoke 10I is secured without fail.

The uneven portions 13aI and 13bI having the plurality of fine V grooves 14a, 14b, 15a, and 15b having a cross-sectional area 16f of substantially several μm$^2$ (square micron/square micrometer) to substantially 0.05 mm$^2$, preferably, greater than or equal to substantially 0.001 mm$^2$ and smaller than or equal to substantially 0.03 mm$^2$ are formed, as the adhesion securing portions 12aI and 12bI, on either one or both of the mounting surfaces 51 making up the magnets 50 and the mounting surfaces 11aI and 11bI making up the back yoke 10I, and thus, the adhesive strength of the magnets 50 to the back yoke 10I is secured without fail, due to the capillarity, etc., of the adhesive 60.

If the cross-sectional area 16f of the V grooves 14a, 14b, 15a, and 15b of the uneven portions 13aI and 13bI formed on either one or both of the adhesion securing portions of the magnets 50 and the adhesion securing portions 12aI and 12bI of the back yoke 10I is set at smaller than substantially 0.0001 mm$^2$, for example, there is a fear that the capillarity hardly occurs. If the cross-sectional area 16f of the V grooves 14a, 14b, 15a, and 15b of the uneven portions 13aI and 13bI provided on either one or both of the adhesion securing portions of the magnets 50 and the adhesion securing portions 12aI and 12bI of the back yoke 10I is set at a value greater than substantially 0.03 mm$^2$, for example, there is a fear that the occurrence of the capillarity becomes difficult. If either one or both of the adhesion securing portions of the magnets 50 and the adhesion securing portions 12aI and 12bI of the back yoke 10I are made up of the uneven portions 13aI and 13bI having the V grooves 14a, 14b, 15a, and 15b each having a cross-sectional area 16f greater than or equal to substantially 0.0001 mm$^2$ and smaller than or equal to substantially 0.03 mm$^2$, the adhesive 60 applied to the adhesion securing portions 12aI and 12bI is easily spread on the adhesion securing portions 12aI and 12bI, due to the capillarity. Thus the adhesive strength of the magnets 50 to the back yoke 10I is secured without fail.

The adhesion securing portions 12aI and 12bI have the plurality of fine V grooves 14a, 14b, 15a, and 15b arranged in a substantially lattice pattern.

If the adhesion securing portions 12aI and 12bI formed is made up as such, the magnets 50 are securely bonded to the back yoke 10I. The adhesive strength is secured by the plurality of fine V grooves 14a, 14b, 15a, and 15b in a substantially lattice pattern of the adhesion securing portions 12aI and 12bI disposed on either one or both of the magnets 50 and the back yoke 10I, so that the magnets 50 and the back yoke 10I are securely bonded together.

The adhesion securing portions 12aI and 12bI have the plurality of fine first direction V grooves 14a and 14b extending substantially along a first direction, which is a lower left direction, for example, and also have the plurality of fine second direction V grooves 15a and 15b extending substantially along a second direction, which is a lower right direction, for example, different from the first direction. The plurality of fine first direction V grooves 14a and 14b and the plurality of fine second direction V grooves 15a and 15b cross each other.

If the adhesion securing portions 12aI and 12bI is formed as such, the magnets 50 are securely bonded to the back yoke 10I. The adhesion securing portions 12aI and 12bI provided on either one or both of the magnets 50 and the back yoke 10I have the plurality of fine first direction V grooves 14a and 14b extending substantially along the lower left first direction, for example, and the plurality of fine second direction V grooves 15a and 15b extending substantially along the lower right second direction, for example, different from the first direction, and the plurality of fine first direction V grooves 14a and 14b and the plurality of fine second direction V grooves 15a and 15b cross each other. This causes the adhesive 60 to flow through the V grooves 14a, 14b, 15a, and 15b and be spread on the adhesion securing portions 12aI and 12bI. As a result, the adhesive 60 is easily spread on the adhesion securing portions 12aI and 12bI. Therefore, adhesive strength is secured, and the magnets 50 and the back yoke 10I are securely bonded together.

The V grooves 14a, 14b, 15a, and 15b of the side walls 10aI and 10bI extend at an inclination of substantially 45° with respect to reference lines 10X, by which the base wall 18 of the back yoke 10I and the side walls 10aI and 10bI are partitioned, and cross each other. The V grooves 14a, 14b and 15a, 15b are substantially orthogonal to each other, and each of the V grooves 14a, 14b crosses each of the V grooves 15a, 15b at substantially 90°.

Each of the V grooves 14a, 14b, 15a, and 15b includes a first inclined surface 16a formed at an inclination of an obtuse angle of substantially 135° (degree) with respect to the reference surfaces 16 of the mounting surfaces 11aI and 11bI of the back yoke 10I, a second inclined surface 16b, substantially orthogonal to the first inclined surface 16a, formed at an inclination of an obtuse angle of substantially 135° with respect to the reference surfaces 16 of the mounting surfaces 11aI and 11bI of the back yoke 10I, a deep end 16e at which the first inclined surface 16a crosses the second inclined surface 16b at substantially 90°, and a groove housing portion 16c formed by making dent portions with the predetermined depth 16d from the reference surfaces 16 of the mounting surfaces 11aI and 11bI to the deep end 16e, for example. The reference surfaces 16 are the reference surfaces 16 for the uneven portions 13aI and 13bI making up the adhesion securing portions 12aI and 12bI of the mounting surfaces 11aI and 11bI of the back yoke 10I.

The adhesive 60 with predetermined viscosity having entered the groove housing portions 16c of the V grooves 14a, 14b, 15a, and 15b develops capillarity, for example. This causes the adhesive 60 to be reliably spread on the uneven portions 13aI and 13bI having the V grooves 14a, 14b, 15a, and 15b that are provided on the adhesion securing portions 12aI and 12bI.

An angle 16g between the first inclined surface 16a and the second inclined surface 16b making up each of the V grooves 14a, 14b, 15a, and 15b is substantially a right angle, however, the angle may be an acute angle or an obtuse angle. The longitudinal cross-sectional shape of each of the V grooves 14a, 14b, 15a, and 15b is not limited to a substantially V shape, but may be a substantially W shape, a substantially U shape, a substantially recessed rectangular shape, etc., for example.

Depending on the mounting structure of the magnet 50, the design/specification of the OPU 3, and the method of bonding the magnet 50 and the yoke 10I, etc., an adhesive application target (not shown), which is a recession of a substantially round hole (not shown), for example, serving as a target for application of the adhesive 60 is formed substantially at the center of the substantially rectangular mounting surface 11aI making up the back yoke 10I, for example. An adhesive application target (not shown), which is a recession of a substantially round hole (not shown), for example, serving as a target for application of the adhesive 60 is formed substantially at the center of the substantially rectangular mounting surface 11bI making up the back yoke 10I, for example.

As illustrated in FIGS. 1, 2A, and 2B, the adhesion securing portions 12aI and 12bI in a fine substantially uneven shape are formed by graining, for example.

If the mounting structure of the magnet 50 illustrated in FIGS. 1, 2A, and 2B is made up, for example, the magnets 50 are securely bonded to the back yoke 10I. "Grain" means a substantially uneven pattern formed on the surface, for example. In this specification, graining means a microfabrication method for forming a pattern, etc., on the surface of a metal, etc., for example. Graining includes engraving by an edged tool, surface treatment by chemicals, and press molding by a metal mold. By either one or both of the fine substantially uneven adhesion securing portions formed by graining on the mounting surfaces 51 making up the magnets 50 and the fine substantially uneven adhesion securing portions 12aI and 12bI formed by graining on the mounting surfaces 11aI and 11bI making up the back yoke 10I, the magnets 50 and the back yoke 10I are securely bonded together with the adhesion strength of the adhesive 60 being secured.

A processing means for forming the fine substantially uneven adhesion securing portions 12aI and 12bI will be described in detail. As illustrated in FIGS. 1, 2A, and 2B, transfer processing is carried out with a press metal molding process, so that the fine substantially uneven adhesion securing portions 12aI and 12bI are transfer molded.

If the mounting structure of the magnet 50 illustrated in FIGS. 1, 2A, and 2B is made up, for example, the magnets 50 are securely bonded to the back yoke 10I. By either one or both of the fine substantially uneven adhesion securing portions transfer molded by the press metal molding process on the mounting surfaces 51 making up the magnets 50 and the fine substantially uneven adhesion securing portions 12aI and 12b1 transfer molded by the press metal molding process onto the mounting surfaces 11aI and 11bI making up the back yoke 10I, the magnets 50 and the back yoke 10I are securely bonded together with the adhesion strength of the adhesive 60 being secured.

Specifically, a raw metal plate (not shown) is subjected to punching, transferring, bending, and presswork substantially at the same time, using a press metal mold (not shown), to form the back yoke 10I with high productivity and to form the adhesion securing portions 12aI and 12bI provided with the uneven portions 13aI and 13bI, etc., having the plurality of fine V grooves 14a, 14b, 15a and 15b, on the mounting surfaces 11aI and 11bI of the side walls 10aI and 10bI of the back yoke 10I with high productivity.

Depending on the mounting structure of the magnet 50, the design/specification of the OPU 3, and the method of bonding the magnet 50 and the yoke 10I, etc., the fine substantially uneven adhesion securing portions 12aI and 12bI are formed by knurling, for example.

For example, magnetic members respectively corresponding to coils (not shown) include a magnet, magnetic steel, etc. Specifically, magnetic members 50 respectively corresponding to coils not shown are formed using a magnet/magnetic steel, for example. The magnetic members 50 are formed using a permanent magnet material, for example. A magnet is a magnetic material composed mainly of iron or iron oxide, for example. The magnetic members 50 are formed using a ferritic magnet containing iron oxide, barium, strontium, etc., for example. Alternatively, the magnetic members 50 are formed using a magnet, magnetic steel, etc., of rare earth/alloy, containing iron, chromium, cobalt, samarium, neodymium, boron, etc., for example. The magnetic steel is alloy steel obtained by adding such an alloy element as chromium, aluminum, nickel, cobalt, etc. to iron, for example, which serves as an alloy magnet, for example, that has permanent magnet properties with a higher coercive force and residual magnetic flux density brought by quench hardening, precipitation hardening, etc., and that is capable of being molded by rolling, etc.

The substantially plate-like magnetic member 50 is formed using a ferritic magnet, rare earth magnet, plastic worked magnet, casted magnet, bond magnet, special magnet, etc., for example. The substantially plate-like magnetic member 50 may be formed using a bond magnet such as a vinyl chloride magnet, rubber magnet, plastic magnet, rare earth bond magnet, depending on the mounting structure of the magnet 50, the design/specification of the OPU 3, and the method of bonding the magnet 50 and the yoke 10I, etc., for example.

For example, magnet 50 is formed using a permanent magnet material. For example, the magnet 50 is formed using a ferritic magnet which is inexpensive, has a high coercive force, is hardly demagnetized, and has high corrosion resistance. Even though an inexpensive ferritic magnet is used as the magnet 50, for example, if there are made up the lens/holder assembly 100 including the lens holder 90, the actuator 5 provided with the lens/holder assembly 100, the OPU 3 provided with actuator 5, and the optical disc apparatus 1 provided with the OPU 3, the sensitivity of the coils to the magnets 50 does not deteriorate and stays at a necessary level with a significant price increase being avoided. The ferritic magnet includes High-Performance Ferritic Magnet NMF (registered trademark) Series produced by Hitachi Metals. Ltd., for example. Specific NMF (registered trademark) products as high-performance ferritic magnets include NMF3B and NFM12G, for example.

Depending on the design/specification of the OPU 3, actuator 5, etc., a rare earth magnet is employed as the magnet 50, which generates a higher magnetic force than a ferritic magnet and have superior thermal stability, for example. The rare earth magnet includes TOSLEX (registered trademark) produced by Toshiba Materials Co., Ltd., for example. Specific TOSLEX (registered trademark) products as rare earth cobalt magnets include TS-24, TS-28HS, for example.

Depending on the design/specification of the OPU 3, actuator 5, etc., an alloy magnet, i.e., a metal magnet is employed as the magnet 50, which generates a higher magnetic force than a ferritic magnet and is processable by such plastic working as rolling, for example. The alloy magnet, i.e., the metal magnet includes NEOMAX (registered trademark) produced by Hitachi Metals. Ltd., for example. Specific NEOMAX (registered trademark) products as metal magnets include NMX-31UH and NMX-33UH, for example.

The driving magnet 50 is used, which is a bipolar magnet having a positive electrode formed on one side on one surface thereof and a negative electrode formed on the other side on one surface thereof, for example. Depending on the mounting structure of the magnet 50, the design/specification of the OPU 3, the method of bonding the magnet 50 and the yoke 10I, etc., a unipolar/bipolar magnet or a multipolar magnet magnetized to have multiple poles may be used as the magnetic member, for example.

The yoke 10I, on which such magnetic members 50 as magnets/magnetic steel is mounted, is formed using a metal material attracted to a magnetic material. For example, the yoke 10I is formed by subjecting a thin-walled steel plate such as a rolled steel plate (not shown) to the press metal molding process, such as punching, bending, and pressing. Specifically, a raw metal plate (not shown), such as a rolled steel plate, composed mainly of iron is processed by a press molding machine (not shown), etc., so that the yoke 10I is formed by punching/bending. Raw metal plates composed mainly of iron include stainless steel plate, rolled steel plate, and band steel, for example. Cold-rolled steel plates and band steels includes SPCC, SPCD, SPCE, etc., specified based on "JIS G 3141", for example.

The adhesive 60 includes a resin/polymer, such as a one-component and/or two-component epoxy resin, acrylic resin, urethane resin, and methacrylic resin, for example. Any one of resins/polymers selected from a group of those resins is used as a polymer/main component making up the one-component and/or two-component adhesive 60, for example. An epoxy resin, a urethane resin, a thermosetting acrylic resin, etc., are thermosetting resin/polymers, for example. A curing agent for the main component of a two-component polymer is provided as a polymer of an amine material, such as a polythiol, polyamide amine, modified polyamine, and tertiary amine, for example. Any one of polymers selected from a group of those polymers is used as a curing agent making up the two-component adhesive 60, for example. The adhesive made of a one-component polymer has superior bonding workability, for example, while the adhesive made of a two-component polymer has a superior price advantage, for example.

For example, the electron beam curing adhesive 60 having a property of curing upon exposure to such light as electron beams can also be used as the adhesive 60. Specifically, the ultraviolet-curing adhesive 60 having a property of curing upon exposure to ultraviolet light can also be used as the adhesive 60. More specifically, the ultraviolet-curing adhesive 60 having a thermosetting property as well as the property of curing upon exposure to ultraviolet light can also be used as the adhesive 60. The thermosetting adhesive 60 and the ultraviolet-curing adhesive 60 can be used in combination.

The specific epoxy adhesive 60 includes Araldite (registered trademark) 2010-1, 2012, etc., produced by Switzerland-based Huntsman (Huntsman Advanced Materials) and sold by Huntsman Japan KK, for example. Araldite (registered trademark) 2010-1 has a viscosity of substantially 80000 mPas (millipascal second) on condition of a temperature of 23° C., and is superior in quick curing. Araldite (registered trademark) 2012 is the two-component adhesive having the main component AW 2104 and the curing agent HW 2934, has a viscosity of substantially 25000 to 35000 mPas on condition of a temperature of 23° C., and is superior in versatility and quick curing.

The specific polyurethane adhesive 60 includes Araldite (registered trademark) 2055, etc., produced by Switzerland-based Huntsman (Huntsman Advanced Materials) and sold by Huntsman Japan KK, for example. Araldite (registered trademark) 2055 has a thixotropic nature, for example, and a tensile shear strength of substantially 9000 mPas, for example, and is superior in space filling.

The modified acrylic adhesive 60 includes Araldite (registered trademark) 2021, etc., produced by Switzerland-based Huntsman (Huntsman Advanced Materials) and sold by Huntsman Japan KK, for example. Araldite (registered trademark) 2021, for example, is the two-component adhesive having the main component XD 4661A and the curing agent XD4661D, has a viscosity of substantially 60000 mPAs on condition of a temperature of 23° C., and requires a minimum curing time of substantially 18 minutes, that is, Araldite 2021 is more superior in quick curing to other Araldite (registered trademark) products.

The adhesive includes an anaerobic adhesive, such as an anaerobic strong sealant produced by ThreeBond Co., Ltd., for example. The anaerobic adhesive is the adhesive that does not cure while in contact with air but cures when cut off from air, for example. The ThreeBond anaerobic strong sealant has an electron beam curing property, such as the ultraviolet-curing property, in combination with the above property, and thus, a forced out portion of the anaerobic adhesive cures when exposed to such electron beams as ultraviolet light. Main components making up the anaerobic adhesive include a (meth) acrylic ester, methacrylic ester, and methacrylic ester monomer, for example.

ThreeBond 1300 Series produced as anaerobic adhesives include ThreeBond (registered trademark) 1359D and ThreeBond (registered trademark) 1373N, for example. ThreeBond (registered trademark) 1359D has a main component of a (meth) acrylic ester before curing, has a viscosity of substantially 14000 mPas at room temperature, for example, which is considered as quick curing, has the electron beam curing property, such as the ultraviolet-curing property, and turns into a polyacrylic resin after curing to have superior vibration resistance, heat resistance, flexibility, and surface adhesiveness. ThreeBond (registered trademark) 1373N has a main component of a methacrylic ester before curing, has a viscosity of substantially 90 mPas at room temperature, for example, which is considered to as quick curing, has the electron beam curing property, such as the ultraviolet-curing property, and turns into a methacrylic resin after curing to have superior vibration resistance, heat resistance, and a low-temperature curing property.

The adhesive includes ThreeBond Instant Adhesives (Gold Label Series), for example. An instant adhesive is an adhesive that bonds materials to be fixed together in quickness at a speed per second i.e., in several seconds to several tens of seconds. ThreeBond 7700 Series as instant adhesives include ThreeBond (registered trademark) 7741, etc. ThreeBond (registered trademark) 7741 has amain component of ethyl 2-cyanoacrylate, has a viscosity of substantially 2 mPas at room temperature, for example, and has a superior instant adhesive property.

The ultraviolet-curing adhesive 60, which is a kind of the electron beam curing adhesive 60, includes optical UV adhesives 60NOA65, NOA68, NOA73, NOA83H, etc., produced by NORLAND Products Inc., for example. The ultraviolet-curing adhesive 60 such as the optical UV adhesives 60NOA65, NOA68, NOA73, NOA83H, is acrylic and a one-component ultraviolet-curing adhesive 60. The acrylic ultraviolet-curing adhesive 60 cures in less time, and is capable of curing within a few seconds. "UV" represents "ultraviolet", and "ultraviolet radiation" means "ultraviolet light". The ultraviolet-curing adhesive 60 is thus called UV-curing adhesive 60.

NOLAND product NOA65 has a viscosity of substantially 1000 to 1200 cps (centipoise) at room temperature, for example, and has flexibility that allows the adhesive to be applied to a delicate part, for example. 1 cps is equivalent to 1 mPas. NOLAND product NOA68 has a viscosity of substantially 5000 cps (centipoise) at room temperature, for example, and has flexibility that allows the adhesive to be applied to a delicate part, for example. NOLAND product NOA73 has a low viscosity of substantially 130 cps at room temperature, for example, and has flexibility that allows the adhesive to be thinly applied to a delicate part, for example. NOLAND product NOA83H has a viscosity of substantially 250 cps at room temperature, for example, has the thermo-setting property in addition to the UV property, and can be applied to a part not directly exposed to light, for example.

The ultraviolet-curing adhesive 60, which is a kind of the electron beam curing adhesive 60 includes U.S. EMI product "OPTOCAST" Series, for example. Specifically, the ultraviolet-curing adhesive 60 includes U.S. EMI products OPTOCAST3415, OPTOCAST3505-HM, etc. The ultraviolet-curing adhesive 60 such as OPTOCAST3415, OPTOCAST3505-HM, etc., is epoxy, and is the one-component ultraviolet-curing adhesive 60. The epoxy ultraviolet-curing adhesive 60 has low contractility and high heat resistance, and superior chemical resistance and moisture resistance. By using the one-component ultraviolet-curing adhesive 60 liquid mixing work becomes unnecessary that is required when using the two-component ultraviolet-curing adhesive 60. Thus, a process of applying the adhesive 60 can be performed more swiftly and efficiently.

EMI OPTOCAST3415 has a viscosity of substantially 100000 cps at room temperature, for example, and is reliably cured by heat application in addition to UV irradiation. EMI OPTOCAST3505-HM has a viscosity of substantially 300 to 500 cps at room temperature, for example, and is reliably cured by UV heat application in addition to irradiation.

As such at least any one of polymers selected from a group of an epoxy polymer, modified acrylic polymer, polyurethane polymer, acrylic ester polymer, and methacrylic ester polymer is used as the polymer/main component making up the one-component and/or two-component adhesive 60, for example. The resin making up the one-component and/or two-component adhesive 60 after curing is at least any one of resins selected from a group of an epoxy resin, modified acrylic resin, polyurethane resin, polyacrylic resin, and polymethacrylic resin, for example. At least one of polymers selected from a group of a polythiol, polyamide amine, modified polyamine, and tertiary amine is used as the curing agent making up the two-component adhesive 60, for example.

For example, one bonded by a bonding process using the two-component ultraviolet-curing adhesive 60 is considered to be applicable, depending on the mounting structure of the magnet 50, the design/specification of the OPU 3, and the method of bonding the magnet 50 and the yoke 10I, etc. The two-component ultraviolet-curing adhesive 60 includes the two-component epoxy ultraviolet-curing adhesive 60, for example. Use of the polymeric adhesive 60, such as the acrylic adhesive 60 and epoxy adhesive 60, enables absorption of high vibrational components, etc., for example.

The viscosity of the adhesive 60 when performing the bonding process is set at substantially 2 mPas or higher to substantially 100000 mPas or lower, for example, on condition of room temperature, specifically at a temperature of 23° C., for example.

If the viscosity of the adhesive 60 on condition of room temperature, specifically at a temperature of 23° C. is set at a high viscosity exceeding substantially 100000 mPas, when the adhesive 60 is applied to either one or both of the adhesion securing portions of the mounting surfaces 51 making up the magnets 50 and the adhesion securing portions 12aI and 12bI of the mounting surfaces 11aI and 11bI making up the back yoke 10I and the mounting surfaces 51 of the magnets 50 are fitted to the mounting surfaces 11aI and 11bI of the back yoke 10I to bond the magnets 50 to the back yoke 10I, it is difficult for the adhesive 60 to be spread on the uneven portions 13aI and 13bI having the V grooves 14a, 14b, 15a, and 15b that are provided on the adhesion securing portions 12aI and 12bI. This results in a fear that the adhesive 60 is not spread substantially uniformly on the mounting surfaces 11aI and 11bI of the back yoke 10I and on the mounting surfaces 51 of the magnets 50.

For this reason, it is preferable that the viscosity of the adhesive 60 when performing the bonding process be set at substantially 60000 mPas or lower on condition of room temperature, specifically at a temperature of 23° C. More preferably, the viscosity of the adhesive 60 on condition of room temperature, specifically at a temperature of 23° C. is set at substantially 14000 mPas or lower, for example, when performing the reliably process. This allows the adhesive 60 to be reliably spread on the uneven portions 13aI and 13bI having the V grooves 14a, 14b, 15a, and 15b that are provided on the adhesion securing portions 12aI and 12bI.

In a case where the viscosity of the adhesive 60 on condition of room temperature, specifically at a temperature of 23° C. is set at a low viscosity lower than substantially 2 mPas, when the adhesive 60 is applied to either one or both of the adhesion securing portions of the mounting surfaces 51 making up the magnets 50 and the adhesion securing portions 12aI and 12bI of the mounting surfaces 11aI and 11bI making up the back yoke 10I and the mounting surfaces 51 of the magnets 50 are fitted to the mounting surfaces 11aI and 11bI of the back yoke 10I to bond the magnets 50 to the back yoke 10I the adhesive 60 may drip, for example.

Preferably, if the viscosity of the adhesive 60 under a room temperature condition, specifically on condition of a temperature of 23° C. is set at substantially 250 mPas or higher, for example, upon execution of the bonding process, it becomes difficult that dripping, etc., of the adhesive 60 occurs, and thus the adhesive 60 reliably stays in the uneven portions 13aI and 13bI having the V grooves 14a, 14b, 15a, and 15b that are provided on the adhesion securing portions 12aI and 12bI.

More preferably, the viscosity of the adhesive 60 on condition of room temperature, specifically at a temperature of 23° C. is set at substantially 1000 mPas or higher, for example, when performing the bonding process, which allows the adhesive 60 to be easily prevented from dropping. Therefore, the adhesive 60 widely and reliably stays on the uneven portions 13aI and 13bI having the V-shaped grooves 14a, 14b, 15a, and 15b that are provided on the adhesion securing portions 12aI and 12bI.

The mounting structure of the magnet 50 in FIGS. 1, 2A, and 2B is included in the OPU 3 in FIGS. 4 and 5, for example. The OPU 3 in FIGS. 4 and 5 includes the mounting structure of the magnet 50 in FIGS. 1, 2A, and 2B, for example.

Since the mounting structure of the magnet 50 in FIGS. 1, 2A, and 2B is incorporated in the OPU 3 (FIGS. 4 and 5), it becomes possible to make up the OPU 3 in which the magnets 50 are securely bonded to the back yoke 10I. With the fine substantially uneven adhesion securing portions 12aI and 12bI disposed on either one or both of the mounting surfaces 51 making up the magnets 50 and the mounting surfaces 11aI and 11bI making up the back yoke 10I, it becomes possible to make up the OPU 3 in which the magnets 50 and the back yoke 10I are securely bonded together in a state where the adhesive strength of the adhesive 60 is secured.

The method of bonding the magnet 50 and the magnetic coupling member 10I will now be described. Specifically, the method of bonding the magnet 50 and the back yoke 10I will be described.

This method of bonding the magnet 50 and the back yoke 10I includes: a step of forming the adhesion securing portions 12aI and 12bI for securing adhesive strength having the plurality of fine V grooves 14a, 14b, 15a, and 15b and the uneven portions 13aI and 13bI for securing adhesive strength on either one or both of the mounting surfaces 51 making up the magnets 50 and the mounting surfaces 11aI and 11bI making up the back yoke 10I, using a metal mold (not shown) having a plurality of fine projections and uneven portions (not shown); a step of applying the adhesive 60 to the adhesion securing portions 12aI and 12bI that are formed on either one or both of the mounting surfaces 51 making up the magnets 50 and the mounting surfaces 11aI and 11bI making up the back yoke 10I and that have the plurality of fine V grooves 14a, 14b, 15a, and 15b and the uneven portions 13aI and 13bI; a step of fitting the mounting surfaces 51 of the magnets 50 to the mounting surfaces 11aI and 11bI of the back yoke 10I and interposing the adhesive 60 between the mounting surfaces 11aI and 11bI of the back yoke 10I and the mounting surfaces 51 of the magnets 50 to bond the magnets 50 to the back yoke 10I; and a step of heating or leaving at room temperature the back yoke 10I having the magnets 50 bonded thereto via the adhesive 60, to cure the adhesive 60 in a state of bonding.

The method of bonding the magnet 50 and the back yoke 10I will be described more specifically. First, the adhesion securing portions 12aI and 12bI for securing adhesive strength having the plurality of fine V grooves 14a, 14b, 15a, and 15b and the uneven portions 13aI and 13bI are formed on either one or both of the mounting surfaces 51 making up the magnets 50 and the mounting surfaces 11aI and 11bI making up the back yoke 10I, using the metal mold having the plurality of fine projections and uneven portions. Subsequently, the adhesive 60 is applied to the adhesion securing portions 12aI and 12bI that are formed on either one or both of the mounting surfaces 51 making up the magnets 50 and the mounting surfaces 11aI and 11bI making up the back yoke 10I and that have the plurality of fine V grooves 14a, 14b, 15a, and 15b and the uneven portions 13aI and 13bI. The mounting surfaces 51 of the magnets 50 are then fitted to the mounting surfaces 11aI and 11bI of the back yoke 10I and the adhesive 60 is interposed between the mounting surfaces 11aI and 11bI of the back yoke 10I and the mounting surfaces 51 of the magnets 50, to bond the magnets 50 to the back yoke 10I. Thereafter, the back yoke 10I provided with the magnets 50 via the adhesive 60 is heated or left at room temperature to cure the adhesive 60 in a state of bonding.

By performing the method of bonding the magnet 50 and the back yoke 10I as such, the magnets 50 are securely bonded to the back yoke 10I. The adhesion securing portions 12aI and 12bI for securing adhesive strength having the plurality of fine V grooves 14a, 14b, 15a, and 15b and the uneven portions 13aI and 13bI are formed on either one or both of the mounting surfaces 51 making up the magnets 50 and the mounting surfaces 11aI and 11bI making up the back yoke 10I, using the metal mold having the not shown fine projections and uneven portions, and the adhesive 60 is applied to the adhesion securing portions 12aI and 12bI that are formed on either one or both of the mounting surfaces 51 making up the magnets 50 and the mounting surfaces 11aI and 11bI making up the back yoke 10I and that have the plurality of fine V grooves 14a, 14b, 15a, and 15b and the uneven portions 13aI and 13bI for securing adhesive strength. Thereafter, the mounting surfaces 51 of the magnets 50 are fitted to the mounting surfaces 11aI and 11bI of the back yoke 10I, and the back yoke 10I provided with the magnets 50 via the adhesive 60 interposed between the mounting surfaces 11aI and 11bI of the back yoke 10I and the mounting surfaces 51 of the magnets 50 is heated or left at room temperature, so that the adhesive 60 is cured in a state of bonding. As a result, the magnets 50 and the back yoke 10I are securely bonded together in a state where the adhesive strength of the adhesive 60 is secured.

The method of bonding the magnet 50 and the back yoke 10I in FIGS. 1, 2A, and 2B will be described more specifically. This method of bonding the magnet 50 and the back yoke 10I includes: a transfer molding process of forming, on the mounting surfaces 11aI and 11bI making up the back yoke 10I, the adhesion securing portions 12aI and 12bI for securing adhesive strength having the plurality of fine V grooves 14a, 14b, 15a, and 15b and the uneven portions 13aI and 13bI, using the metal mold having the plurality of fine projections and uneven portions; an adhesive/adhesive applying process of applying the thermosetting adhesive 60 to either one of the mounting surfaces 51 making up the magnets 50 and the mounting surfaces 11aI and 11bI making up the back yoke 10I, an mounting/bonding process of fitting the mounting surfaces 51 of the magnets 50 to the mounting surfaces 11aI and 11bI of the back yoke 10I and interposing the thermosetting adhesive 60 between the mounting surfaces 11aI and 11bI of the back yoke 10I and the mounting surfaces 51 of the magnets 50, to bond the magnets 50 to the back yoke 10I; and a heating/adhesive fixing process of heating the back yoke 10I provided with the magnets 50 via the thermosetting adhesive 60, to cure the thermosetting adhesive 60 in a state of bonding.

Depending on the mounting structure of the magnet 50, the design/specification of the OPU 3, and the method of bonding the magnet 50 and the yoke 10I, etc., after the mounting surfaces 51 of the magnets 50 are fitted to the mounting surfaces 11aI and 11bI of the back yoke 10I to bond both mounting surfaces together, the ultraviolet-curing adhesive (60) may be additionally applied between the end faces 53, 54, and 55 of the magnet 50 and the back yoke 10I and be cured by ultraviolet light, to securely bond/fix the magnets 50 and the back yoke 10I together, for example.

For example, by performing a transfer process for an object using a metal mold having uneven portions not shown formed thereon by graining, the adhesion securing portions 12aI and 12bI having the plurality of fine V grooves 14a, 14b, 15a, and 15b and the uneven portions 13aI and 13bI are formed by transfer on either one or both of the mounting surfaces 51 making up the magnets 50 and the mounting surfaces 11aI and 11bI making up the back yoke 10I.

By performing the method of bonding the magnet 50 and the back yoke 10I as above, the magnets 50 are securely bonded to the back yoke 10I. The fine substantially uneven adhesion securing portions 12aI and 12bI are formed by performing a metal-mold transfer molding process on either one or both of the mounting surfaces 51 making up the magnets 50 and the mounting surfaces 11aI and 11bI making up the back yoke 10I, using the metal mold having the uneven portions not shown formed thereon by graining. With either one or both of the fine substantially uneven adhesion securing portions formed, by the metal-mold transfer molding process, on the mounting surfaces 51 making up the magnets 50 and the fine substantially uneven adhesion securing portions 12aI and 12bI formed, by the metal-mold transfer molding process, on the mounting surfaces 11aI and 11bI making up the back yoke 10I, the magnets 50 and the back yoke 10I are securely bonded together in a sate where the adhesive strength of the adhesive 60 is secured.

By performing a transfer process for an object using a metal mold having projections and uneven portions not shown formed thereon by engraving, the adhesion securing portions 12aI and 12bI having the plurality of fine V grooves 14a, 14b, 15a, and 15b and the uneven portions 13aI and 13bI are formed by transfer on either one or both of the mounting surfaces 51 making up the magnets 50 and the mounting surfaces 11aI and 11bI making up the back yoke 10I.

By performing the method of bonding the magnet 50 and the back yoke 10I as above, the magnets 50 are securely bonded to the back yoke 10I. The fine substantially uneven adhesion securing portions 12aI and 12bI are formed by performing the metal-mold transfer molding process on either one or both of the mounting surfaces 51 making up the magnets 50 and the mounting surfaces 11aI and 11bI making up the back yoke 10I, using the metal mold having the projections and uneven portions not shown formed thereon by engraving. With either one or both of the fine substantially uneven adhesion securing portions formed, by the metal-mold transfer molding process, on the mounting surfaces 51 making up the magnets 50 and the fine substantially uneven adhesion securing portions 12aI and 12bI formed, by the metal-mold transfer molding process, on the mounting surfaces 11aI and 11bI making up the back yoke 10I, the magnets 50 and the back yoke 10I are securely bonded together in a state where the adhesive strength of the adhesive 60 is secured.

By performing a transfer process in combination with a press metal molding process for an object using a metal mold having a plurality of fine projections and uneven portions not shown, the adhesion securing portions 12aI and 12bI having the plurality of fine V grooves 14a, 14b, 15a, and 15b and the uneven portions 13aI and 13bI are formed by transfer on either one or both of the mounting surfaces 51 making up the magnets 50 and the mounting surfaces 11aI and 11bI making up the back yoke 10I.

By performing the method of bonding the magnet 50 and the back yoke 10I as above, the magnets 50 are securely bonded to the back yoke 10I. The fine substantially uneven adhesion securing portions 12aI and 12bI are transfer formed, by performing the press metal molding process, on either one or both of the mounting surfaces 51 making up the magnets 50 and the mounting surfaces 11aI and 11bI making up the back yoke 10I, using the metal mold having the plurality of fine projections and uneven portions not shown. With either one or both of the fine substantially uneven adhesion securing portions transfer formed, by the press metal molding process, on the mounting surfaces 51 making up the magnets 50 and the fine substantially uneven adhesion securing portions 12aI and 12bI transfer formed, by the press metal molding process, on the mounting surfaces 11aI and 11bI making up the back yoke 10I, the magnets 50 and the back yoke 10I are securely bonded together in a state where the adhesive strength of the adhesive 60 is secured.

By performing the press metal molding process for either one or both of the mounting surfaces 51 making up the magnets 50 and the mounting surfaces 11aI and 11bI making up the back yoke 10I, using the metal mold having the plurality of fine projections and uneven portions not shown, the fine substantially uneven adhesion securing portions 12aI and 12bI are transfer formed, with high productivity, on either one or both of the mounting surfaces 51 making up the magnets 50 and the mounting surfaces 11aI and 11bI making up the back yoke 10I.

Specifically, a raw metal plate not shown is subjected to punching, transferring, bending, and presswork substantially at the same time, using a press metal mold not shown, so as to become capable of efficiently forming the back yoke 10I, and also capable of efficiently forming, on the side walls 10aI and 10bI of the back yoke 10I, the adhesion securing portions 12aI and 12bI provided with the uneven portions 13aI and 13bI having the plurality of fine V grooves 14a, 14b, 15a, and 15b.

The method of bonding the magnet 50 and the back yoke 10I is carried out to perform a method of manufacturing the OPU 3, so that the OPU 3 is made up.

By performing the method of manufacturing the OPU 3 as above, the OPU 3 in which the magnets 50 is securely bonded to the back yoke 10I can be made up. The adhesion securing portions 12aI and 12bI for securing adhesive strength having the plurality of fine V grooves 14a, 14b, 15a, and 15b and the uneven portions 13aI and 13bI are formed on either one or both of the mounting surfaces 51 making up the magnets 50 and the mounting surfaces 11aI and 11bI making up the back yoke 10I, using the metal mold having the fine projections and uneven portions not shown, and the adhesive 60 is applied to the adhesion securing portions 12aI and 12bI that are formed on either one or both of the mounting surfaces 51 making up the magnets 50 and the mounting surfaces 11aI and 11bI making up the back yoke 10I and that have the plurality of fine V grooves 14a, 14b, 15a, and 15b and the uneven portions 13aI and 13bI. Thereafter, the mounting surfaces 51 of the magnets 50 are fitted to the mounting surfaces 11aI and 11bI of the back yoke 10I, and the back yoke 10I provided with the magnets 50 with the adhesive 60 interposed between the mounting surfaces 11aI and 11bI of the back yoke 10I and the mounting surfaces 51 of the magnets 50 is heated to cure the adhesive 60 in a state of bonding. As a result, the magnets 50 and the back yoke 10I are securely bonded together in a sate where the adhesive strength of the adhesive 60 is secured, so that the OPU 3 is made up.

The OPU 3 in FIG. 4 includes light-emitting elements 210 and 220 (FIG. 4), i.e., laser diodes (LD) that emit laser light on the optical disc M (FIG. 5). The OPU 3 also includes a drive circuit unit, i.e., a so-called laser driver (LDD: LD driver) that supplies currents to the LDs 210 and 220 to allow them to emit light. The OPU 3 further includes a flexible board (not shown), such as a flexible printed circuit (not shown), that electrically connects such electrical components as LDs 210 and 220 to such electrical components as the LDDs. The flexible printed circuit is abbreviated as "FPC". The FPC is configured by printing a plurality of circuit conductors on an insulating sheet made of a heat-resistant synthetic resin, such as polyimide (PI) resin with superior heat resistance upon soldering, etc., by disposing a metal foil, such as a copper foil, in adjacent to the insulating sheet, and by providing a transparent or translucent protective layer (all not shown) thereon.

Currents flow from the LDD not shown to the first LD 210 through the FPC, and the first LD 210 outputs laser light, for example. The first LD 210 emits laser light of 0.2 to 500 mW (milliwatt) for "CD" capable of emitting infrared laser light having a wavelength of substantially 765 to 840 nm (nanometer) and a reference wavelength of substantially 780 nm, for example. Currents flows from the LDD not shown to the second LD 220 through the FPC, and the second LD 220 emits laser light, for example. The second LD 220 emits laser light of 0.2 to 500 mW (milliwatt) for "DVD" capable of emitting red laser light having a wavelength of substantially 630 to 685 nm and a reference wavelength of substantially 635 nm or 650 nm, for example.

Depending on the design/specification of the optical disc apparatus 1, the OPU 3, etc., the LDs 210/220 emit laser light of 0.2 to 500 mW for "CBHD", "HD DVD", and "Blu-ray Disc" capable of emitting blue-violet laser light having a wavelength of substantially 340 to 450 nm, preferably of substantially 380 to 450 nm, more preferably a wavelength greater than substantially 400 nm and smaller than or equal to 450 nm and a reference wavelength of substantially 405 nm, for example. In such case, the LDs 210/220 are configured as the special LDs 210/220 capable of emitting laser light having a plurality of kinds of wavelengths, for example. Various types of LDs can be used as the LDs 210/220, for example.

The LDs 210 and 220 emit laser light of an output value greater than 0.2 or equal and smaller than or equal to 500 mW, specifically greater than 0.5 and smaller than or equal to 400 mW, for example. When the laser light is smaller than 0.2 mW in output value, for example, the light quantity of laser light is insufficient which reaches a light-receiving element 290 after being applied on and reflected from the optical disc M. When data, etc., in the optical disc M is reproduced, laser light of an output value of several tenths mW to several tens mW, e.g., greater than substantially 0.2 mW, preferably, greater than 0.5 mW and smaller than or equal to 20 mW is sufficient. When data, etc., is written into the optical disc M, laser light of an output value of several tens mW to several hundreds mW is required. When data, etc., is written into the optical disc M at high speed, for example, pulse laser light of a high output value of 400 mW, 500 mW, etc., may be required.

The OPU 3 includes the OBL 250 that condenses laser light to form a focus spot on the signal layer Ma of the optical disc M. The OBL 250 is formed as the convex lens 250 having a substantially convex curved surface 251.

For example, a transparent or translucent, thermoplastic, heat-resistant synthetic resin material that can be molded by injection molding is used to form the OBL 250 based on an injection molding method. Specifically, the OBL 250 is formed by using a composition having a base material of an acrylic/methacrylic resin superior in weather resistance, mirror surface smoothness, precision, and transparency and formed based on the injection molding method, for example. The formal name of the methacrylic resin is polymethyl methacrylate, which is abbreviated as PMMA, for example. The methacrylic resin may be called an acrylic resin. The OBL 250 is formed also using a composition having a base material of a polycarbonate (PC) resin superior in processability and allowing price reduction, for example.

Forming the OBL 250 using a synthetic resin material leads to a reduction in the weight of the OBL 250, for example. The substantially convex OBL 250 made of a synthetic resin is efficiently mass-produced based on the injection molding method. Achieving mass production of the OBL 250 leads to a reduction in the price of the OBL 250. Depending on the design/specification of the optical disc apparatus 1, the OPU 3, etc., the OBL 250 is formed using a translucent or transparent glass material, instead of the translucent or transparent synthetic resin material, for example.

The OPU 3 includes the lens holder 90 making up the lens/holder assembly 100. The lens holder 90 is formed by using a thermoplastic, aromatic-ring-containing, heat-resistant synthetic resin superior in moldability and formed based on the injection molding method advantageous for mass production. Specifically, the lens holder 90 is formed using a composition having a base material of a liquid crystal polymer (LCP) superior in thin-walled/precision moldability, heat resistance upon soldering, etc., and injection moldability and capable of a weight reduction than an iron material, for example. The liquid crystal polymer includes a superior heat resistant, wholly-aromatic liquid crystal resin, etc., for example. Forming the lens holder 90 based on the injection molding method allows efficient mass production of the lens holder 90 even if the lens holder 90 is in a complicated shape.

The OPU 3 includes the light-receiving element 290, i.e., PDIC (Photodiode IC) or photodetector (PD) 290 that receives laser light reflected by the signal layer Ma of the optical disc M. The PD 290 includes at least three light-receiving units consisting of a main light-receiving unit (not shown) in a substantially rectangular shape in a plan view corresponding to a main beam (zero order light) having passed through a diffraction grating (not shown), which is multiply divided such as a quad type, etc., and a pair of sub-beam receiving units each in a substantially rectangular shape in a plan view corresponding to a pair of sub-beams (±1st order diffracted beam) have been diffracted/split by passing through a diffraction grating, for example. The main light-receiving unit in a substantially rectangular shape in a plan view includes four segments each in a substantially rectangular shape in a plan view which are obtained by being substantially equally divided into four. The sub-beam receiving unit in a substantially rectangular shape in a plan view includes four segments in a substantially rectangular shape in a plan view which are obtained by being substantially equally divided into four. As such, the OPU 3 is provided with the PD 200 having the light-receiving units of multiply divided types each having a plurality of segments in a substantially rectangular shape in a plan view.

The PD 290 receives laser light reflected by the signal layer Ma of the optical disc M, and converts its signal into an electric signal, to detect data, information, signals, etc., recorded in the signal layer Ma of the optical disc M. The PD 290 receives laser light reflected by the signal layer Ma of the optical disc M, and converts the signal into an electric signal, to operate the servo mechanism of the lens/holder assembly 100 including the lens holder 90 with the OBL 250 that makes up the OPU 3. For example, when the OPU 3 reads recorded data, information, signals, etc., from the optical disc M, writes data, information, signals, etc., into the optical disc M, or deletes recorded data, information, signals, etc., from the optical disc M, laser light is applied onto each of the light-receiving units of the PD 290, to detect amain information signal of the optical disc M, a focus error signal, tracking error signal, etc., for the optical disc M.

A focusing detecting method for a focus spot on the optical disc M in the OPU 3 includes a detecting method based on a differential astigmatic method, for example. The differential astigmatic method is a method of detecting the displacement of a focus spot by detecting the distortion of a point image formed by an optical system with astigmatism, for example. The focusing detecting method for a focus spot in the OPU 3 is the detecting method based on the differential astigmatic method, for example. The focusing detecting method may be used in combination with other detecting methods, such as the Foucault process and the knife-edge method, for example.

A tracking detecting method for a focus spot on the optical disc M in the OPU 3 includes a detecting method based on a differential push-pull (DPP) method, for example. The differential push-pull method is a method of detecting the displacement of a focus spot by a main beam for data reading/writing and two sub-beams for detecting a positional deviation correction signal, for example. The tracking detecting method for a focus spot in the OPU 3 is the detecting method based on the differential push-pull method, for example. The tracking detecting method may be used in combination with other detecting methods, such as the phase contrast method and the heterodyne detection method, for example.

The OPU 3 includes a plurality of substantially linear metal elastic support members 80, i.e., substantially linear metal suspension wires 80 that are provided in the substantially rectangular boxlike lens/holder assembly 100 and elastically support the lens/holder assembly 100. Each of the substantially linear suspension wires 80 making up the OPU 3 extends substantially along a tangential direction D3 orthogonal to the focus direction D1, which is substantially along the optical axis direction D1 of the OBL 250, and to the tracking direction D2, which is substantially along the one radius direction D2 of the optical disc M, for example. The tangential direction D3 represents another radius direction of the optical disc M, depending on the rotation position, etc., of the optical disc M, for example. An electric signal serving as a drive signal, control signal, etc., is supplied to at least four, preferably six of six left/right suspension wires 80 provided in the lens/holder assembly 100 of the OPU 3. This causes an electric signal serving as a drive signal, control signal, etc., to flow through at least four, preferably six coils that are provided in the lens/holder assembly 100 of the OPU 3 to be electrically connected to the suspension wires 80.

Each of the substantially linear suspension wires 80 is formed using a conductor made of phosphor bronze, for example. An element wire making up the suspension wire 80 is formed using a piano wire material specified based on "JIS G 3402", a piano wire specified based on "JIS G 3522", a hard steel wire specified based on "JIS G 3521", etc., for example. The suspension wire 80 is composed using a copper-plating conductor for which plate processing is performed based on electroplating, for example. Specifically, a copper wire or a piano wire having superior spring durability, fatigue strength, etc., is coated with a highly conductive copper (Cu) to compose the electrically conductive suspension wire 80.

The OPU 3 includes a substantially gelled damping material (not shown) made of a synthetic polymer, which suppresses abnormal vibrations occurring on the suspension wire 80, and a damping holding member 140 made of a synthetic resin, which holds the damping material, for example. Each of the suspension wires 80 is inserted through each of the holes (not shown) of the synthetic resin damping holding member 140 mounted on the back of the metal back yoke 10I. The holes of the damping holding member 140, through which the suspension wires 80 are inserted, are filled with a highly flexible damping material made of a synthetic polymer, i.e., damping agent, for example. The damping holding member 140 is formed using a synthetic resin material having superior insulation properties, and is formed using a synthetic resin material, such as a polycarbonate resin, based on the injection molding method advantageous for mass production, for example.

The OPU 3 includes a circuit board 150 provided with the metal suspension wires 80 that is electrically connected thereto. The circuit board is referred to as PWB (Printed Wired Board/Printed Wiring Board), etc., for example. The board body 151 of the PWB 150 is formed using a synthetic resin material having superior insulation properties. A circuit conductor on the synthetic resin board body 151 is formed as a highly conductive metal foil. The synthetic resin board body 151 having the metal circuit conductor formed thereon is coated with a synthetic resin material having superior insulation properties, to form an insulating film on the synthetic resin board body 151 having the metal circuit conductor formed thereon.

The OPU 3 includes a solder material with which the coils, etc., are reliably electrically connected to the suspension wires 80, etc., and the OPU 3 also includes a solder material with which the suspension wires 80, etc., are reliably electrically connected to the PWB 150, etc. Environment-conscious solder not containing lead, i.e., lead-free solder is adopted as a solder material to be used for soldering the suspension wires 80, coils, etc. If lead-free solder is used as the solder material, it is avoided that lead affects the natural environment when disassembling/scrapping the OPU 3, the optical disc apparatus 1 including the OPU 3, etc., for example.

The OPU 3 includes a covering plate 180 for protecting various components in the OPU 3. When the OPU 3 is assembled, the covering plate 180 for protecting various components is disposed on the upper side of the OPU 3, for example. The covering plate 180 is formed by press molding using a thin-walled metal plate having superior heat dissipating properties, for example.

Instead of the covering plate 180 made of a thin-walled metal plate, the black covering plate (180) made of a synthetic resin may be provided on the upper side of the OPU 3, for example.

The OPU 3 includes a housing 300 that houses various optical components, electrical components, etc. Housing means a box, a boxlike object or an object similar to a box, etc., in which devices and components are housed, for example. The housing 300 is formed using a metal material having superior heat dissipating properties or a resin material having superior slide properties, for example.

Optical components housed in the housing 300 include a laser diode, half-wave plate (½-λ plate), aperture-limited wideband quarter-wave plate (¼-λ plate), liquid crystal correction element, diffractive optical element (DOE), diffraction grating (inline grating), divergent lens, prism, polarizing beam splitter, dichroic filter, collimating lens, beam expander lens, half mirror, reflection mirror, total reflection mirror, objective lens, front monitor diode, sensor lens, anamorphic lens, intermediate lens, and photodetector, for example. The OPU 3 includes these optical components.

Electrical components housed in the housing 300 include a printed-circuit board, memory device (ROM: Read Only Memory), suspension wire, coil, actuator, flexible printed circuit, laser driver, laser diode, liquid crystal correction element, beam expander unit, front monitor diode, and photodetector, for example. The OPU 3 includes these electrical components.

Such various components (not shown) as optical components and electrical components making up the OPU 3 are housed in the housing 300 made of a metal or synthetic resin. The housing 300 includes a housing body 301 which houses such various components as optical components and electrical components, a pair of bearings 311 and 312 (FIGS. 4 and 5) for a primary shaft that are projected from the housing body 301 and are movably mated with a first shaft member 410 (FIG. 5), and a bearing 321 for a secondary shaft (FIGS. 4 and 5) that is projected from the housing body 301 in the direction opposite to the bearings 311 and 312 for the primary shaft and is movably mated with a second shaft member 420 (FIG. 5). The bearings 311 and 312 for the primary shaft and the bearing 321 for the secondary shaft are integrally formed with the housing body 301. The bearings 311 and 312 for the primary shaft, the bearing 321 for the secondary shaft, and the housing body 301 are formed as a single assembly using the same metal material or the same synthetic resin material, for example.

The housing 300 making up the OPU 3 is formed using metal, such as a nonferrous metal, die-casting alloy, etc., containing at least one or more elements selected from aluminum (Al), magnesium (Mg), and zinc (Zn), for example. Aluminum, magnesium, and zinc are superior in corrosion resistance and are nonferrous metal having a specific gravity smaller than iron. The housing 300 is made up using a nonferrous metal material, such as aluminum alloy mainly composed of aluminum, for example.

The housing 300 making up the OPU 3 is formed using a heat-resistant synthetic resin composition having a base material of a polyarylene sulfide (PAS) resin, such as a polyphenylene sulfide resin (PPS), that has superior mechanical properties, slide properties, dimensional stability, heat resistance, injection moldability, electrical properties including insulation properties, etc., and that is capable of more weight reduction than an iron material, for example. A resin material is smaller in specific gravity than iron, for example, thereby being regarded as a material suitable for weight reduction.

When the OPU 3 moves substantially along the longitudinal direction D2 of the substantially round bar-like shaft members 410 and 420, the substantially round hole-like first bearing 311 comes in sliding contact with the substantially round bar-like first shaft member 410. When the OPU 3 moves substantially along the longitudinal direction D2 of the substantially round bar-like shaft members 410 and 420, the substantially round hole-like second bearing 312 comes in sliding contact with the substantially round bar-like first shaft member 410. When the OPU 3 moves substantially along the longitudinal direction D2 of the substantially round bar-like shaft members 410 and 420, the third bearing 321 having a toppled substantially U-shaped sliding bearing structure comes in sliding contact with the substantially round bar-like second shaft member 420.

The shaft members 410 and 420 are formed as slide shafts 410 and 420 capable of being in sliding contact with the bearings 311, 312, and 321 of the housing 300 in the OPU 3, for example. The shaft members 410 and 420 are formed using "hot-finished stainless steel bar" specified based on "JIS G 4304", "cold-finished stainless steel bar" specified based on "JIS G 4318", etc., for example. The bearings 311, 312, and 321 are formed as sliding units 311, 312, and 321 capable of being in sliding contact with the slide shafts 410 and 420, for example.

The OPU 3 is movably supported on the pair of slide shafts 410 and 420 in a stable substantially three-point structure by the first sliding unit 311, second sliding unit 312, and third sliding unit 321 of the housing 300. Being movably supported on the pair of slide shafts 410 and 420 at main three points of the OPU 3 with the first sliding unit 311, second sliding unit 312, and third sliding unit 321 of the housing 300, the OPU 3 has less friction than an OPU having a four-point support structure (not shown), for example.

Because the third sliding unit 321 is made up having the toppled substantially U-shaped open sliding bearing structure, a work of mounting the OPU 3 onto the slide shaft 420 serving as the secondary shaft is easily performed, for example. Because the third sliding unit 321 is made up having the toppled substantially U-shaped open sliding bearing structure, a slight error in parallelism, etc., of the second slide shaft 420 serving as the secondary shaft relative to the first slide shaft 410 serving as the primary shaft is absorbed by the third sliding unit 321 having the toppled substantially U-shaped open sliding bearing structure, for example.

The optical disc apparatus 1 in FIG. 5 includes the above OPU 3 having the mounting structure of the magnet 50. Since the optical disc apparatus 1 is provided with the OPU 3 having the mounting structure of the magnet 50, it becomes possible to make up the optical disc apparatus 1 including the OPU 3 with the magnets 50 securely bonded to the back yoke 10I.

The optical disc apparatus 1 includes: a tray (not shown) on which the optical disc M can be mounted and which can be moved in and out for an optical disc body 1*a*; a clamp device which has a turn table 460, and a clamper (not shown) facing the turn table 460 and which can clamp the optical disc M to be fixed; a driver 450 which drives to rotate the optical disc M together with the turn table 460; the OPU 3 which apply laser light onto the optical disc M; and the pair of slide shafts 410 and 420 which movably support the OPU 3 when the OPU 3 is moved along one radius direction D2 of the optical disc M.

For a substantially rectangular boxlike metal enclosure 400, i.e., cover 400 making up the optical disc apparatus 1, the substantially plate-like synthetic resin tray not shown which is capable of moving in and out is used to house the optical disc M in the optical disc apparatus 1. The driver 450 that rotates the optical disc M is housed in the cover 400 making up the optical disc apparatus 1. As the driver 450, the disc driver 450 is used which includes the substantially round plate-like synthetic resin turn table 460 on which the optical disc M is placed. The cover 400 making up the optical disc apparatus 1 is provided with the OPU 3 that reads data, information, and signals from the optical disc M and records data, information, signals in the optical disc M, and deletes data, information, and signals from the optical disc M. An upper metal cover (not shown) is fitted on the lower metal cover 400 provided with various components, to make up the optical disc apparatus 1.

Using the clamp device including the turn table 460 and the clamper facing the turn table 460, the optical disc M having a round hole Mb formed at a center portion Mc thereof is positioned and securely clamped between the turn table 460 and the clamper and is removably fixed thereat. The turn table 460 provided on a spindle motor (not shown) of the driver 450 has both functions of aligning the optical disc M and ensuring the stable high-speed rotation of the optical disc M.

The OPU 3 and the optical disc apparatus 1 including the OPU 3 can be used as a recording/reproducing apparatus that records data, information, signals, etc., in the above various optical discs M and/or reproduces data, information, signals, etc., in the above various optical discs M. Specifically, the OPU 3 and the optical disc apparatus 1 including the OPU 3 can be used as a recording/reproducing/deleting apparatus that records data, information, signals, etc., in the various optical discs M, reproduces data, information, signals, etc., in the various optical discs M, and/or deletes data, information, signals, etc., in the various optical discs M. The OPU 3 and the optical disc apparatus 1 including the OPU 3 can also be used as a reproducing-only apparatus that reproduces data, information, signals, etc., on the various optical discs M.

The OPU 3 is provided in the optical disc apparatus 1, which is mounted onto a computer, audio/video equipment, game machine, in-vehicle equipment, etc (all not shown), for example. The OPU 3 and the optical disc apparatus 1 including the OPU 3 can be provided in a computer, such as notebook personal computer (notebook PC), laptop PC, desktop PC, and in-vehicle computer, in a game machine, such as computer game machine, and in an audio and/or video equipment, such as CD player, CD recorder, DVD player, and DVD recorder (all not shown), for example. The OPU 3 can support a plurality of types of discs, such as "CD"-type optical disc, "DVD"-type optical disc, "HD DVD"-type optical disc, "CBHD"-type optical disc, and "Blu-ray Disc"-type optical disc. The OPU 3 can support a single optical disc having a signal surface composed of a plurality of layers. The OPU 3 can be provided in a computer, audio and/or video equipment, game machine, in-vehicle equipment, etc., which can support various optical discs, such as "CD", "DVD", "HD DVD", "CBHD", and "Blu-ray Disc" (all not shown), for example.

<Second Embodiment>

FIG. 6 illustrates a second embodiment of a mounting structure of a magnetic member and a method of bonding a magnetic member and a magnetic coupling member according to the present invention.

In the mounting structure of the magnetic member 50 and the method of bonding the magnetic member 50 and the magnetic coupling member 10I according to a first embodiment in FIGS. 1, 2A, and 2B, the plurality of substantially grooves 14a, 14b, 15a, and 15b in a substantially lattice shape are formed on the mounting surfaces 11aI and 11bI of the side walls 10aI and 10bI making up the back yoke 10I, to provide the adhesion securing portions 12aI and 12bI having the plurality of substantially rectangular inclined lattice-shaped or substantially inclined strip-like uneven portions 13aI and 13bI.

Likewise, in the mounting structure of the magnetic member 50 and the method of bonding the magnetic member 50 and a magnetic coupling member 10II according to a second embodiment in FIG. 6, the plurality of grooves 14a, 14b, 15a, and 15b in a substantially lattice pattern are formed on mounting surfaces 11aII and 11bII of side walls 10aII and 10bII making up the back yoke 10II, to provide adhesion securing portions 12aII and 12bII having a plurality of substantially rectangular inclined lattice-shaped or substantially inclined strip-like uneven portions 13aII and 13bII.

In these respects, the mounting structure of the magnetic member 50 and the method of bonding the magnetic member 50 and the magnetic coupling member 10I according to a first embodiment in FIGS. 1, 2A, and 2B is regarded as the same as the mounting structure of the magnetic member 50 and the method of bonding the magnetic member 50 and the magnetic coupling member 10II according to a second embodiment in FIG. 6. The mounting surface 11aII of the side wall 10aII making up the back yoke 10II in FIG. 6 is, however, provided with a pair of adhesive member reservoir portions 17a and 17a.

Except that the mounting surface 11aII of the side wall 10aII making up the back yoke 10II is provided with the pair of adhesive member reservoir portions 17a and 17a, the back yoke 10II according to the mounting structure of the magnetic member 50, the method of bonding the magnetic member 50 and the magnetic coupling member 10II, the pickup unit 3, and the disc apparatus 1 in a second embodiment is substantially the same in description as the back yoke 10I according to the mounting structure of the magnetic member 50, the method of bonding the magnetic member 50 and the magnetic coupling member 10I, the pickup unit 3, and the disc apparatus 1 in a first embodiment.

In the mounting structure of the magnetic member 50, the method of bonding the magnetic member 50 and the magnetic coupling member 10II, the pickup unit 3, and the disc apparatus 1 according to a second embodiment to be described referring to FIG. 6, substantially the same constituents as described in the mounting structure of the magnetic member 50, the method of bonding the magnetic member 50 and the magnetic coupling member 10I, the pickup unit 3, and the disc apparatus 1 according to a first embodiment described referring to FIGS. 1 to 5 will be designated by the same reference numerals and detailed descriptions thereof will be omitted.

The substantially rectangular cutout-like or substantially recessed adhesive member reservoir portions 17a and 17a that lead the adhesive 60 to the adhesion securing portion 12aII are provided on either one or both of the mounting surface 51 making up the magnet 50 and the mounting surface 11aII making up the back yoke 10II.

With the configuration of the mounting structure of the magnetic member 50 in FIG. 6, the substantially rectangular plate-like magnet 50 is securely bonded to the substantially rectangular plane mounting surface 11aII making up the back yoke 10II. With the adhesive member reservoir portions 17a and 17a formed on either one or both of the mounting surface 51 making up the magnet 50 and the mounting surface 11aII making up the back yoke 10II, the magnet 50 and the back yoke 10II are securely bonded together in a state where the adhesive strength of the adhesive 60 is secured. Specifically, with the adhesive member reservoir portions 17a and 17a formed on the mounting surface 11aII making up the back yoke 10II, the magnet 50 is securely bonded to the back yoke 10II in a state where the adhesive strength of the adhesive 60 is secured.

The adhesion securing portion 12aII includes the uneven portion 13aII. The adhesive member reservoir portions 17a and 17a include a pair of upper left/right, substantially rectangular dent portions 17aL and 17aR. When the adhesive 60 for bonding/joining the magnet 50 and the back yoke 10II together is applied to either one or both of the magnet 50 and the back yoke 10II, the substantially rectangular dent portions 17aL and 17aR of the pair of left/right adhesive member reservoir portions 17a and 17a are disposed so as to be located substantially on the upper side relative to the uneven portion 13aII of the adhesion securing portion 12aII. The definition of "upper", "lower", "left", and "right" in this specification is defined for convenience.

The adhesion securing portion 12aII includes the substantially V-shaped grooves 14a and 15a. The adhesive member reservoir portions 17a and 17a includes the pair of upper left/right substantially rectangular dent portions 17aL and 17aR. The depth 16d of the substantially V-shaped grooves 14a and 15a is substantially the same as the depth of the substantially rectangular dent portions 17aL and 17aR.

With the configuration of the mounting structure of the magnet 50 in FIG. 6, the magnet 50 is securely bonded to the back yoke 10II. Before the magnet 50 is mounted onto the back yoke 10II or after the magnet 50 has been mounted onto the back yoke 10II, the adhesive 60 is applied to either one or both of the adhesive member reservoir portions of the mounting surface 51 making up the magnet 50 and the adhesive member reservoir portions 17a and 17a of the mounting surface 11aII making up the back yoke 10II is easily spread, due to capillarity, etc., for example, by the substantially rectangular dent portions 17aL and 17aR of the pair of upper left/right adhesive member reservoir portions 17a and 17a provided on either one or both of the magnet 50 and the back yoke 10II and by the substantially V-shaped grooves 14a and 15a making up the uneven portion 13aII of the adhesion securing portion 12aII. As a result, adhesive strength is secured, so that the magnets 50 and the back yoke 10II are securely bonded together. For example, the magnet 50 is mounted on the back yoke 10II being aligned therewith, and then the adhesive 60 is supplied from the upper side to the pair of upper left/right adhesive member reservoir portions 17a and 17a of either one or both of the magnet 50 and the back yoke 10II. Thus, it is substantially avoided that the applied adhesive 60 runs off the periphery 57 of the magnet 50 or the periphery 17 of the back yoke 10II, for example, and the adhesive 60 is stably supplied to the uneven portion 13aII of the adhesion securing portion 12aII by gravity and/or the capillarity. Therefore, the adhesive 60 is easily spread on the adhesion securing portion 12aII.

The adhesive member reservoir portions 17a and 17a include the plurality of dent portions 17aL and 17aR whose depth is greater than 0 mm and smaller than or equal to substantially 0.2 mm. The dent portions 17aL and 17aR are formed as the dent portions 17aL and 17aR with a predetermined depth that can be precisely and easily molded by presswork, for example. Specifically, on the assumption that the side wall 10aII is cut, the depth of the dent portions 17aL and 17aR in a longitudinal cross-sectional view is greater than 0 mm and smaller than or equal to substantially 0.2 mm, for example.

As such, the magnet 50 is securely bonded to the back yoke 10II. Before the magnet 50 is mounted onto the back yoke 10II or after the magnet 50 has been mounted onto the back yoke 10II, the adhesive 60 is applied to either one or both of the adhesive member reservoir portions of the mounting surface 51 making up the magnet 50 and the adhesive member reservoir portions 17a and 17a of the mounting surface 11aII making up the back yoke 10II is easily spread, due to the capillarity, etc., for example, by the plurality of dent portions whose depth is greater than 0 mm and smaller than or equal to substantially 0.2 mm making up the adhesive member reservoir portions of the mounting surface 51 of the magnet 50 or by the plurality of dent portions 17aL and 17aR whose depth is greater than 0 mm and smaller than or equal to substantially 0.2 mm making up the adhesive member reservoir portions 17a and 17a of the mounting surface 11aII of the back yoke 10II, thereby realizing secure surface bonding.

If the dent portions 17aL and 17aR provided on either or both of the adhesive member reservoir portions of the magnet 50 and the adhesive member reservoir portions 17a and 17a of the back yoke 10II are set at 0 mm in depth, for example, there is a fear that the capillarity, etc., hardly occurs. If the dent portions 17aL and 17aR provided on either one or both of the adhesive member reservoir portions of the magnet 50 and the adhesive member reservoir portions 17a and 17a of the back yoke 10II are set at a value greater than substantially 0.2 mm in depth, for example, there is a fear that the occurrence of the capillarity, etc., becomes difficult. When either one or both of the adhesive member reservoir portions of the magnet 50 and the adhesive member reservoir portions 17a and 17a of the back yoke 10II include the dent portions 17aL and 17aR whose depth is greater than 0 mm and smaller than or equal to substantially 0.2 mm, the adhesive 60 applied to the adhesive member reservoir portions 17a and 17a is easily spread from the adhesive member reservoir portions 17a and 17a to the uneven portion 13aII of the adhesion securing portion 12aII, due to the capillarity, etc. Therefore, the adhesive strength of the magnets 50 to the back yoke 10II is secured without fail.

When the plurality of dent portions 17aL and 17aR with a depth of substantially several μm to 0.2 mm, preferably, a depth greater than substantially 0.01 mm and smaller than or equal to substantially 0.15 mm are formed as the adhesive member reservoir portions 17a and 17a on either one or both of the mounting surface 51 making up the magnets 50 and the mounting surface 11aII making up the back yoke 10II, the adhesive strength of the magnets 50 to the back yoke 10II is secured without fail due to the capillarity, etc., of the adhesive 60.

If the depth of the dent portions 17aL and 17aR provided on either one or both of the adhesive member reservoir portions of the magnet 50 and the adhesive member reservoir portions 17a and 17a of the back yoke 10II is set at a value smaller than substantially 0.01 mm, for example, there is a fear that the occurrence of the capillarity, etc., becomes difficult. If the depth of the dent portions 17aL and 17aR provided on either one or both of the adhesive member reservoir portions of the magnet 50 and the adhesive member reservoir portions 17a and 17a of the back yoke 10II is set at a value greater than substantially 0.15 mm, for example, there is a fear that the occurrence of the capillarity, etc., becomes difficult. When either one or both of the adhesive member reservoir portions of the magnet 50 and the adhesive member reservoir portions 17a and 17a of the back yoke 10II include the dent portions 17aL and 17aR whose depth is greater than substantially 0.01 mm and smaller than or equal to substantially 0.15 mm, the adhesive 60 applied to the adhesive member reservoir portions 17a and 17a is easily spread on the adhesive member reservoir portions 17a and 17a due to the capillarity. Therefore, the adhesive strength of the magnets 50 to the back yoke 10II is secured without fail.

The method of bonding the magnet 50 and the magnetic coupling member 10II will then be described. Specifically, the method of bonding the magnet 50 and the back yoke 10II will be described.

This method of bonding the magnet 50 and the back yoke 10II includes: a step of forming the adhesion securing portions 12aII/12bII, for securing adhesive strength, including the plurality of fine V grooves 14a, 15a/14b, 15b, the uneven portions 13aII/13bII, and the plurality of substantially rectangular cutout-like adhesive member reservoir portions 17a and 17a on either one or both of the mounting surfaces 51 making up the magnets 50 and the mounting surfaces 11aII/11bII making up the back yoke 10II, using a metal mold having a plurality of fine projections, uneven portions, and a plurality of substantially rectangular plane projections (all not shown); a step of fitting the mounting surfaces 51 of the magnets 50 to the mounting surfaces 11aII/11bII of the back yoke 10II; a step of temporarily placing the back yoke 10II having the magnets 50 mounted thereon on a workbench (not shown) etc., in a state where the substantially rectangular cutout-like adhesive member reservoir portions 17a and 17a is positioned on the upper side thereof; a step of applying the adhesive 60 to the substantially rectangular cutout-like adhesive member reservoir portions 17a and 17a from the upper side of the open substantially rectangular cutout-like adhesive member reservoir portions 17a and 17a; a step of bonding the magnets 50 to the back yoke 10II by allowing the adhesive 60 to sufficiently lie between the mounting surfaces 11aII/11bII of the back yoke 10II and the mounting surfaces 51 of the magnets 50 due to the capillarity/gravity; and a step of curing the adhesive 60 in a state of bonding by heating or leaving in an ordinary temperature the back yoke 10II having the magnets 50 mounted thereon via the adhesive 60.

For example, it is possible to use a configuration where the adhesion securing portion 12bII for securing adhesive strength is formed to include the plurality of fine V grooves 14b and 15b, the uneven portion 13bII, and the plurality of substantially rectangular cutout-like adhesive member reservoir portions on the mounting surface 11bII making up the back yoke 10II. It is also possible to use a configuration where the adhesion securing portion for securing adhesive strength is formed to include the plurality of fine V grooves, the uneven portions, and the plurality of substantially rectangular cutout-like adhesive member reservoir portions on the mounting surface 51 of the magnet 50.

The method of bonding the magnet 50 and the back yoke 10II will be specifically described. First, the adhesion securing portions 12aII/12bII for securing adhesive strength including the plurality of fine V grooves 14a, 15a/14b, 15b, the uneven portions 13aII/13bII, and the plurality of substantially rectangular cutout-like adhesive member reservoir portions 17a and 17a are formed on either one or both of the mounting surfaces 51 making up the magnets 50 and the mounting surfaces 11aII/11bII making up the back yoke 10II, using the metal mold having the plurality of fine projections, the uneven portions, and the plurality of substantially rectangular plane projections. Subsequently, the mounting surfaces 51 making up the magnets 50 are fitted to the mounting surfaces 11aII/11bII of the back yoke 10II. The back yoke 10II having the magnets 50 mounted thereon is temporarily placed on the workbench (not shown) etc., in a state where the substantially rectangular cutout-like adhesive member reservoir portions 17a and 17a is positioned on the upper side thereof. Subsequently, the adhesive 60 is applied to the substantially rectangular cutout-like adhesive member reservoir portions 17a and 17a from the upper side of the open substantially rectangular cutout-like adhesive member reservoir portions 17a and 17a. The adhesive 60 is then allowed to sufficiently lie between the mounting surfaces 11aII/11bII of the back yoke 10II and the mounting surfaces 51 of the magnets 50 by the capillarity/gravity, to bond the magnets 50 to the back yoke 10II. After that, the back yoke 10II having the magnets 50 mounted thereon via the adhesive 60 is heated or left in an ordinary temperature, to cure the adhesive 60 in a state of bonding.

By performing the method of bonding the magnet 50 and the back yoke 10II as above, the magnets 50 are securely bonded to the back yoke 10II. The adhesion securing portions 12aII/12bII for securing adhesive strength including the plurality of fine V grooves 14a, 15a/14b, 15b, the uneven portions 13aII/13bII, and the plurality of substantially rectangular cutout-like adhesive member reservoir portions 17a and 17a are formed on either one or both of the mounting surfaces 51 making up the magnets 50 and the mounting surfaces 11aII/11bII making up the back yoke 10II, using the metal mold having the plurality of fine projections, the uneven portions, and the plurality of substantially rectangular plane projections not shown; the mounting surfaces 51 of the magnets 50 are fitted to the mounting surfaces 11aII/11bII of the back yoke 10II; the back yoke 10II having the magnets 50 mounted thereon is temporarily placed on the workbench (not shown) etc., in a state where the substantially rectangular cutout-like adhesive member reservoir portions 17a and 17a is positioned on the upper side thereof; and then the adhesive 60 is applied to the substantially rectangular cutout-like adhesive member reservoir portions 17a and 17a from the upper side of the open substantially rectangular cutout-like adhesive member reservoir portions 17a and 17a. Thereafter, the back yoke 10II having the magnets 50 mounted thereon via the adhesive 60 is heated or left in an ordinary temperature in a state where the adhesive 60 sufficiently lies between the mounting surfaces 11aII/11bII of the back yoke 10II and the mounting surfaces 51 of the magnets 50 by the capillarity/gravity, and cure the adhesive 60 is cured in a state of bonding. Therefore, the magnet 50 and the back yoke 10II are securely bonded together in a state where the adhesive strength of the adhesive 60 is secured.

The method of bonding the magnet 50 and the back yoke 10II in FIG. 6 will be described more specifically. This method of bonding the magnet 50 and the back yoke 10II includes: a transfer molding process of forming the adhesion securing portions 12aII/12bII for securing adhesive strength including the plurality of fine V grooves 14a, 15a/14b, 15b, the uneven portions 13aII/13bII, and the plurality of substantially rectangular cutout-like adhesive member reservoir portions 17a and 17a, on the mounting surfaces 11aII/11bII making up the back yoke 10II, using the metal mold having the plurality of fine projections, the uneven portions, and the plurality of substantially rectangular plane projections; an mounting process of fitting the mounting surfaces 51 of the magnets 50 to the mounting surfaces 11aII/11bII of the back yoke 10II; a temporarily placing process of temporarily placing the back yoke 10II having the magnets 50 mounted thereon on the workbench etc., in a state where the substantially rectangular cutout-like adhesive member reservoir portions 17a and 17a is positioned on the upper side thereof; an adhesive/adhesive applying process of applying the adhesive 60 to the substantially rectangular cutout-like adhesive member reservoir portions 17a and 17a from the upper side the open substantially rectangular cutout-like adhesive member reservoir portions 17a and 17a; a bonding/holding process of bonding the magnets 50 to the back yoke 10II by allowing the adhesive 60 to sufficiently lie between the mounting surfaces 11*a*II/11*b*II of the back yoke 10II and the mounting surfaces 51 of the magnets 50 due to the capillarity/gravity; and a heating/adhesive fixing process of curing the adhesive 60 in a state of bonding by heating the back yoke 10II having the magnets 50 mounted thereon via the adhesive 60.

Depending on the mounting structure of the magnet 50, the design/specification of the OPU 3, and the method of bonding the magnet 50 and the yoke 10II, after the mounting surfaces 51 of the magnets 50 are fitted to the mounting surfaces 11*a*II/11*b*II of the back yoke 10II to bond both mounting surfaces together, the ultraviolet-curing adhesive (60) may be additionally applied between the end faces 53, 54, and 55 of the magnet 50 and the back yoke 10II and be cured by ultraviolet light to securely bond/fix the magnets 50 and the back yoke 10II together, for example.

For example, by performing a transfer processing for an object using a metal mold having uneven portions not shown formed thereon by graining, the adhesion securing portions 12*a*II/12*b*II including the plurality of fine V grooves 14*a*, 15*a*/14*b*, 15*b* and the uneven portions 13*a*II/13*b*II are formed by transfer on either one or both of the mounting surfaces 51 making up the magnets 50 and the mounting surfaces 11*a*II/11*b*II making up the back yoke 10II.

By performing the method of bonding the magnet 50 and the back yoke 10II as above, the magnets 50 are securely bonded to the back yoke 10II. The adhesion securing portions 12*a*II/12*b*II are formed by performing the metal-mold transfer molding process on either one or both of the mounting surfaces 51 making up the magnets 50 and the mounting surfaces 11*a*II/11*b*II making up the back yoke 10II, using the metal mold having the uneven portions not shown formed thereon by graining. With either one or both of the adhesion securing portions formed by the metal-mold transfer molding process on the mounting surfaces 51 making up the magnets 50 and the adhesion securing portions 12*a*II/12*b*II formed by the metal-mold transfer molding process on the mounting surfaces 11*a*II/11*b*II making up the back yoke 10II, the magnets 50 and the back yoke 10II are securely bonded together in a state where the adhesive strength of the adhesive 60 is secured.

By performing transfer processing for an object using a metal mold having projections, uneven portions, and substantially rectangular plane projections not shown formed thereon by engraving, the adhesion securing portions 12*a*II/12*b*II including the plurality of fine V grooves 14*a*, 15*a*/14*b*, 15*b*, the uneven portions 13*a*11/13*b*II, and the plurality of substantially rectangular cutout-like adhesive member reservoir portions 17*a* and 17*a* are formed by transfer on either one or both of the mounting surfaces 51 making up the magnets 50 and the mounting surfaces 11*a*II/11*b*II making up the back yoke 10II.

By performing the method of bonding the magnet 50 and the back yoke 10II as above, the magnets 50 are securely bonded to the back yoke 10II. The adhesion securing portions 12*a*II/12*b*II are formed by performing the metal-mold transfer molding process on either one or both of the mounting surfaces 51 making up the magnets 50 and the mounting surfaces 11*a*II/11*b*II making up the back yoke 10II, using the metal mold having the projections, uneven portions, and substantially rectangular plane projections not shown formed thereon by engraving. With either one or both of the adhesion securing portions formed by the metal-mold transfer molding process on the mounting surfaces 51 making up the magnets 50 and the adhesion securing portions 12*a*11/12*b*II formed by the metal-mold transfer molding process on the mounting surfaces 11*a*II/11*b*II making up the back yoke 10II, the magnets 50 and the back yoke 10II are securely bonded together in a state where the adhesive strength of the adhesive 60 is secured.

By performing transfer process in combination with the press metal molding process for an object using a metal mold having a plurality of fine projections, uneven portions, and a plurality of substantially rectangular plane projections not shown, the adhesion securing portions 12*a*II/12*b*II including the plurality of fine V grooves 14*a*, 15*a*/14*b*, 15*b*, the uneven portions 13*a*II/13*b*II, and the plurality of substantially rectangular cutout-like adhesive member reservoir portions 17*a* and 17*a* are formed by transfer on either one or both of the mounting surfaces 51 making up the magnets 50 and the mounting surfaces 11*a*II/11*b*II making up the back yoke 10II.

By performing the method of bonding the magnet 50 and the back yoke 10II as above, the magnets 50 are securely bonded to the back yoke 10II. The adhesion securing portions 12*a*II/12*b*II are transfer formed by performing the press metal molding process on either one or both of the mounting surfaces 51 making up the magnets 50 and the mounting surfaces 11*a*II/11*b*II making up the back yoke 10II, using the metal mold having a plurality of fine projections, uneven portions, and a plurality of substantially rectangular plane projections not shown. With either one or both of the adhesion securing portions transfer formed by the press metal molding process on the mounting surfaces 51 making up the magnets 50 and the adhesion securing portions 12*a*II/12*b*II transfer formed by the press metal molding process on the mounting surfaces 11*a*II/11*b*II making up the back yoke 10II, the magnets 50 and the back yoke 10II are securely bonded together in a state where the adhesive strength of the adhesive 60 is secured.

By performing the press metal molding process on either one or both of the mounting surfaces 51 making up the magnets 50 and the mounting surfaces 11*a*II/11*b*II making up the back yoke 10II, using the metal mold having a plurality of fine projections, uneven portions, and a plurality of substantially rectangular plane projections not shown, the adhesion securing portions 12*a*11/12*b*II are transfer formed with high productivity on either one or both of the mounting surfaces 51 making up the magnets 50 and the mounting surfaces 11*a*II/11*b*II making up the back yoke 10II.

Specifically, a raw metal plate not shown is subjected to punching, transferring, bending, and presswork substantially at the same time, using a press metal mold not shown, so as to become capable of efficiently forming the back yoke 10II, and also capable of efficiently forming, on the side walls 10*a*I/10*b*I of the back yoke 10I, the adhesion securing portions 12*a*11/12*b*II provided with the uneven portions 13*a*11/13*b*II including the plurality of fine V grooves 14*a*, 15*a*/14*b*, 15*b* and with the plurality of substantially rectangular cutout-like adhesive member reservoir portions 17*a* and 17*a*.

Figure 6A:
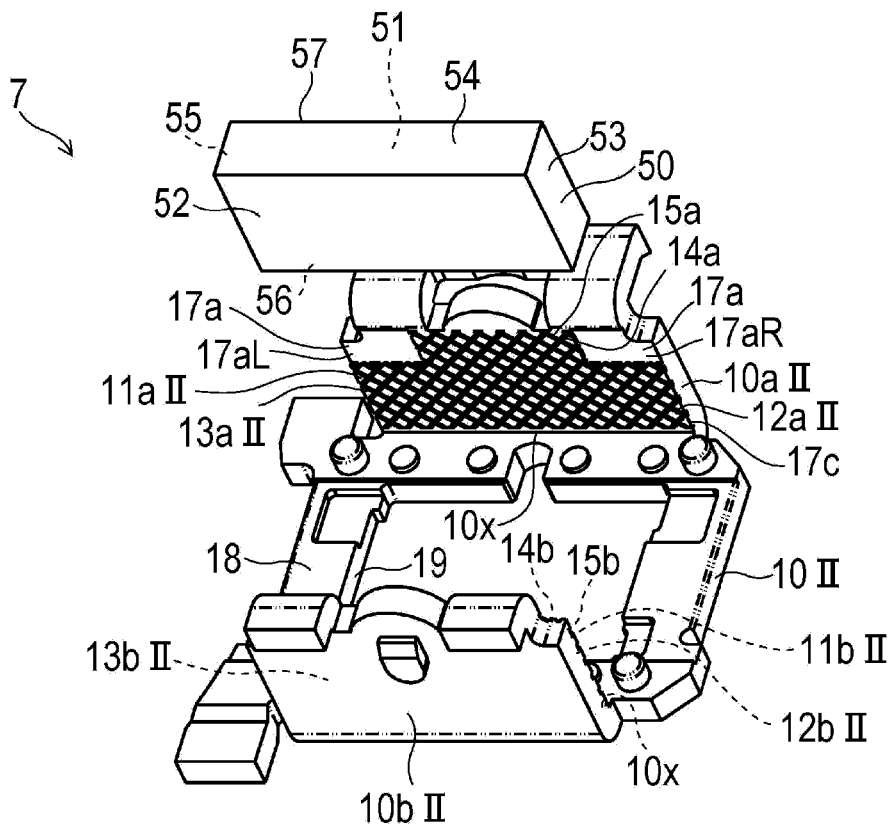
FIG. 6A is an exploded perspective view of a mounting structure of a magnetic member and a method of bonding the a magnetic member and a magnetic coupling member according to a second embodiment of the present invention.
Figure 6B:
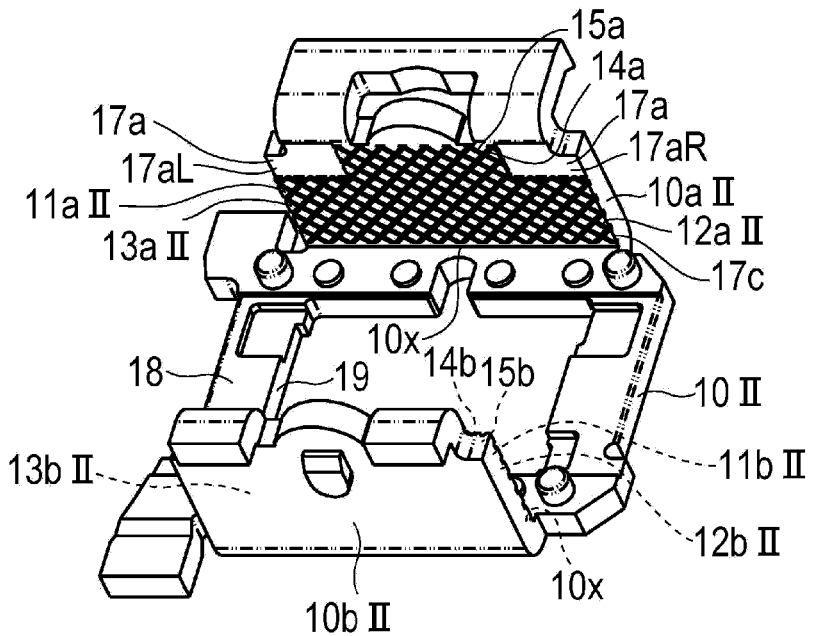
FIG. 6B is also an explanatory diagram of a mounting structure of a magnetic member and a method of bonding the magnetic member and a magnetic coupling member according to a second embodiment of the present invention.

The method of bonding the magnetic member (50) and the magnetic coupling member (10II) in FIGS. 6A and 6B may be performed based on the method of bonding the magnetic member 50 and the magnetic coupling member 10I according to a first embodiment 1 as described above referring to FIGS. 1, 2A, and 2B. The method of bonding the magnetic member (50) and the magnetic coupling member (10II) in FIGS. 6A and 6B may be performed in combination with the method of bonding the magnetic member 50 and the magnetic coupling member 10II as described above referring to FIGS. 6A and 6B, based on the method of bonding the magnetic member 50 and the magnetic coupling member 10I according to a first embodiment 1 as described above referring to FIGS. 1, 2A, and 2B.

<Third Embodiment>

Figure 7:
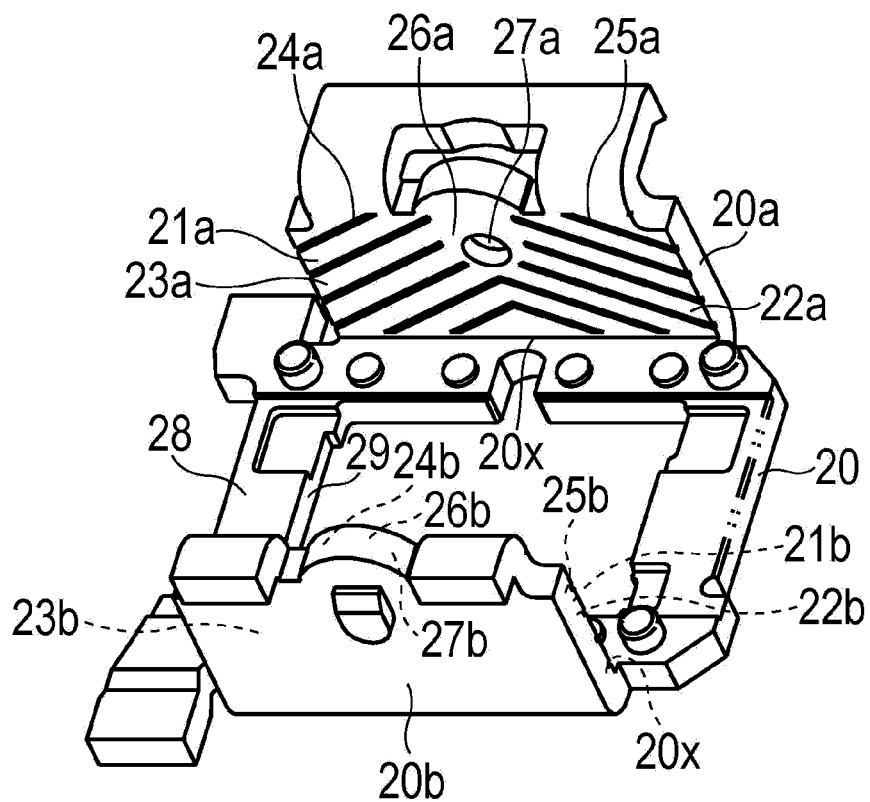
FIG. 7 is an explanatory diagram of a mounting structure of a magnetic member and a method of bonding the magnetic member and a magnetic coupling member according to a third embodiment of the present invention.

FIG. 7 illustrates a third embodiment of a mounting structure of a magnetic member and a method of bonding a magnetic member and a magnetic coupling member according to the present invention.

In the mounting structure of the magnetic member 50 and the method of bonding the magnetic member 50 and the magnetic coupling member 10I according to a first embodiment in FIGS. 1, 2A, and 2B, the plurality of grooves 14a, 14b, 15a, and 15b in a substantially lattice shape are formed on the mounting surfaces 11aI and 11bI of the side walls 10aI and 10bI making up the back yoke 10I, to provide the adhesion securing portions 12aI and 12bI having the plurality of substantially rectangular inclined lattice-shaped or substantially inclined strip-like uneven portions 13aI and 13bI. In the mounting structure of the magnetic member 50 and the method of bonding the magnetic member 50 and the magnetic coupling member 20 according to a third embodiment in FIG. 7, a plurality of grooves 24a, 24b, 25a, and 25b, which extends substantially along directions different from each other, are formed on the mounting surfaces 21a and 21b of side walls 20a and 20b making up the back yoke 20, to provide adhesion securing portions 22a and 22b having a plurality of substantially inclined strip-like uneven portions 23a and 23b.

According to a third embodiment, the plurality of grooves 24a, 24b, 25a, and 25b extending substantially along directions different from each other are formed in place of the plurality of grooves 14a, 14b, 15a, and 15b in a substantially lattice shape in a first embodiment.

Except that the plurality of grooves 24a, 24b, 25a, and 25b extending substantially along directions different from each other are formed in place of the plurality of grooves 14a, 14b, 15a, and 15b in a substantially lattice shape, the back yoke 20 according to the mounting structure of the magnetic member 50, the method of bonding the magnetic member 50 and the magnetic coupling member 20, the pickup unit 3, and the disc apparatus 1 in a third embodiment is substantially the same in description as the back yoke 10I according to the mounting structure of the magnetic member 50, the method of bonding the magnetic member 50 and the magnetic coupling member 10I, the pickup unit 3, and the disc apparatus 1 in a first embodiment.

While the reference surface 16, the inclined surfaces 16a and 16b, the groove housing portion 16c, the groove depth (depth) 16d, the deep end 16e, the cross-sectional area (area) 16f, the angle 16g, etc., are described referring to FIG. 3 in describing the V grooves 14a, 14b, 15a, and 15b; the V grooves 24a, 24b, 25a, and 25b in FIG. 7 are the same in the detailed description as the reference surface 16, the inclined surfaces 16a and 16b, the groove housing portion 16c, the groove depth (depth) 16d, the deep end 16e, the cross-sectional area (area) 16f, the angle 16g, etc., in FIG. 3. In this case, the reference surfaces 16 represents the reference surfaces 16 of the uneven portions 23a and 23b making up the adhesion securing portions 22a and 22b of the mounting surfaces 21a and 21b of the back yoke 20, for example.

In the mounting structure of the magnetic member 50, the method of bonding the magnetic member 50 and the magnetic coupling member 20, the pickup unit 3, and the disc apparatus 1 according to a third embodiment, which will be described referring to FIG. 7, substantially the same constituents in the descriptions of the mounting structure of the magnetic member 50, the method of bonding the magnetic member 50 and the magnetic coupling member 10I, the pickup unit 3, and the disc apparatus 1 according to a first embodiment, which have been described referring to FIGS. 1 to 5, will be designated by the same reference numerals and detailed descriptions thereof will be omitted.

The substantially U-shaped back yoke 20 includes a base wall 28 formed into a substantially hollow rectangular plate-like shape and a pair of the side walls 20a and 20b extending substantially orthogonal to the base wall 28. The substantially rectangular mounting surface 21a serving as the mounting surface of the first side wall 20a making up the back yoke 20 is provided with the adhesion securing portion 22a for securing the adhesive strength of the adhesive 60. At the substantially center portion 26a of the substantially rectangular mounting surface 21a, an adhesive application target 27a, e.g., substantially round hole-shaped recession 27a is formed as a target when the adhesive 60 is applied. The substantially rectangular mounting surface 21b serving as the mounting surface of the second side wall 20b making up the back yoke 20 is provided with the adhesion securing portion 22b for securing the adhesive strength of the adhesive 60. At the substantially center portion 26b of the substantially rectangular mounting surface 21b, an adhesive application target 27b, e.g., substantially round hole-shaped recession 27b is formed as a target when the adhesive 60 is applied. The substantially rectangular plate-like base wall 28 making up the back yoke 20 has a substantially rectangular hole-shaped through-hole 29 through which laser light passes.

The adhesion securing portions 22a and 22b include the plurality of substantially inclined strip-like uneven portions 23a and 23b, for example.

With the adhesion securing portions 22a and 22b formed as above, the magnets 50 are securely bonded to the back yoke 20. Before the magnets 50 is mounted on the back yoke 20, or after the magnets 50 have been mounted on the back yoke 20, the adhesive 60 applied to either one or both of the adhesion securing portions of the mounting surfaces 51 making up the magnets 50 and the adhesion securing portions 22a and 22b of the mounting surfaces 21a and 21b making up the back yoke 20 is easily spread on the plurality of substantially inclined strip-like uneven portions, for example, which make up the adhesion securing portions of the mounting surfaces 51 of the magnets 50, or on the plurality of substantially inclined strip-like uneven portions 23a and 23b, for example, which make up the adhesion securing portions 22a and 22b of the mounting surfaces 21a and 21b of the back yoke 20, due to the capillarity, thereby realizing secure surface bonding. Thus the adhesive strength of the magnets 50 to the back yoke 20 is secured without fail.

The adhesion securing portions 22a and 22b include the plurality of first direction V grooves 24a and 24b extending substantially along a lower left first direction, for example, and also include the plurality of second direction V grooves 25a and 25b extending substantially along a lower right second direction, for example, which is different from the first direction. Some of the plurality of first direction V grooves 24a and 24b and some of the plurality of second direction V grooves 25a and 25b cross each other.

With the adhesion securing portions 22a and 22b formed as above, the magnets 50 are securely bonded to the back yoke 20. The adhesion securing portions 22a and 22b disposed on either one or both of the magnets 50 and the back yoke 20 include the plurality of first direction V grooves 24a and 24b extending substantially along the lower left first direction, for example, and the plurality of second direction V grooves 25a and 25b extending substantially along the lower right second direction, for example, which is different from the first direction. Some of the plurality of first direction V grooves 24a and 24b and some of the plurality of second direction V grooves 25a and 25b cross each other. This causes the adhesive 60 to flow through the V grooves 24a, 24b, 25a, and 25b and be spread on the adhesion securing portions 22a and 22b. As a result, the adhesive 60 is easily spread on the adhesion securing portions 22a and 22b. Thus adhesive strength is secured, and the magnets 50 and the back yoke 20 are securely bonded together.

The V grooves 24a, 24b, 25a, and 25b of the side walls 20a and 20b extend at an inclination of substantially 45° with respect to reference lines 20X, by which the base wall 28 of the back yoke 20 and the side walls 20a and 20b are partitioned, and partially cross each other. Some of the V grooves 24a, 24b, 25a, and 25b are substantially orthogonal to each other, for example, and some of the V grooves 24a, 24b cross some of the V grooves 25a, 25b at substantially 90°, for example.

<Fourth Embodiment>

Figure 8:
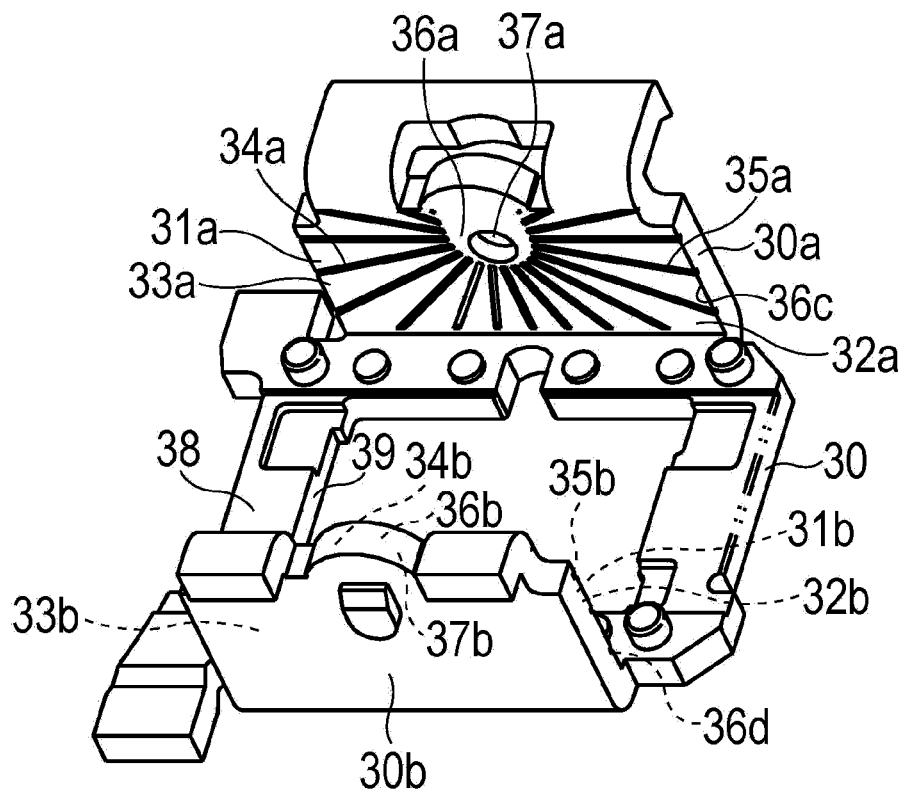
FIG. 8 is an explanatory diagram of a mounting structure of a magnetic member and a method of bonding the magnetic member and a magnetic coupling member according to a fourth embodiment of the present invention.
Figure 9A:
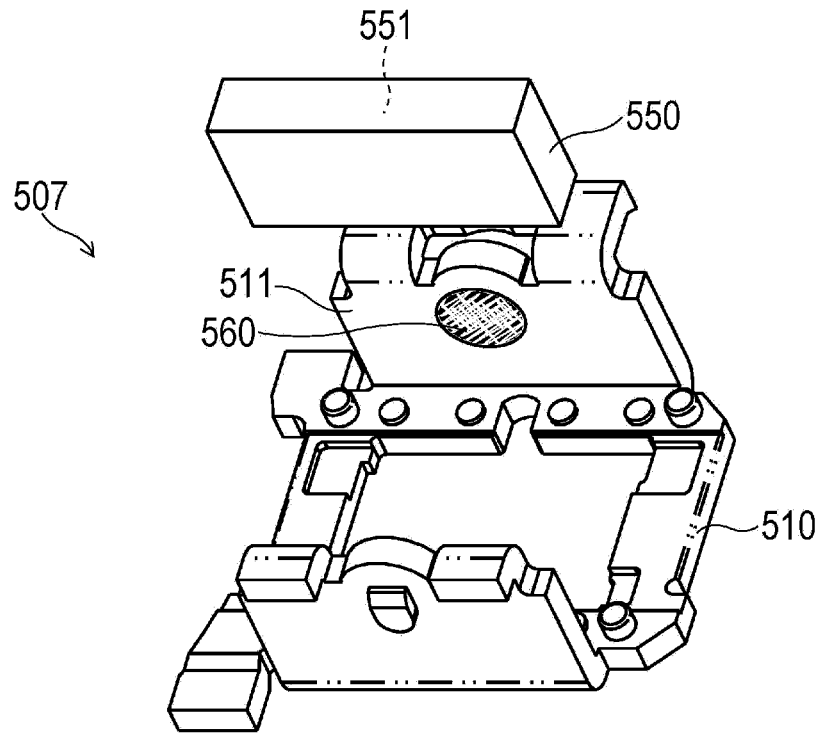
FIG. 9A is an exploded perspective view of one form of a mounting structure of a magnetic member and a method of bonding the magnetic member and a magnetic coupling member.
Figure 9B:
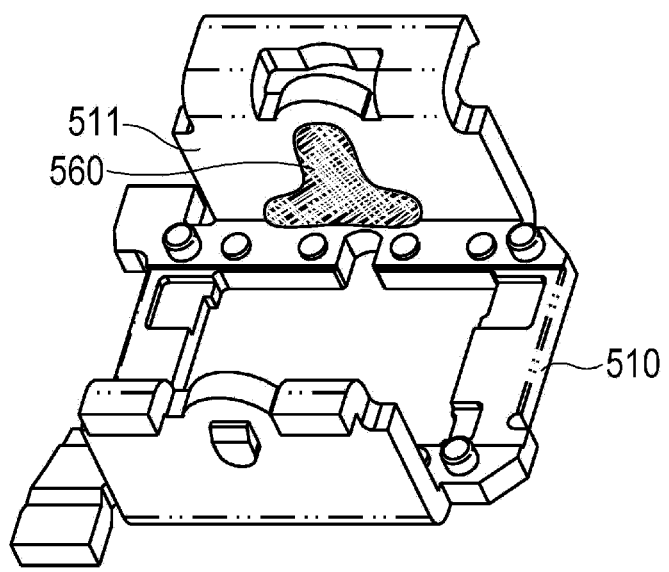
FIG. 9B is an explanatory diagram of one form of a mounting structure of a magnetic member and a method of bonding the magnetic member and a magnetic coupling member.

FIG. 8 illustrates a fourth embodiment of a mounting structure of a magnetic member and a method of bonding a magnetic member and a magnetic coupling member according to the present invention.

In the mounting structure of the magnetic member 50 and the method of bonding the magnetic member 50 and the magnetic coupling member 10I according to a first embodiment in FIGS. 1, 2A, and 2B, the plurality of grooves 14a, 14b, 15a, and 15b in a substantially lattice shape are formed on the mounting surfaces 11aI and 11bI of the side walls 10aI and 10bI making up the back yoke 10I, to provide the adhesion securing portions 12aI and 12bI having the plurality of substantially rectangular inclined lattice-shaped or substantially inclined strip-like uneven portions 13aI and 13bI. In the mounting structure of the magnetic member 50 and the method of bonding the magnetic member 50 and the magnetic coupling member 30 according to a fourth embodiment in FIG. 8, a plurality of grooves 34a, 34b, 35a, and 35b extending substantially radially along different directions, respectively, are formed on the mounting surfaces 31a and 31b of side walls 30a and 30b making up the back yoke 30, to provide adhesion securing portions 32a and 32b having a plurality of substantially radial uneven portions 33a and 33b.

According to a fourth embodiment, the plurality of grooves 34a, 34b, 35a, and 35b extending substantially radially along different directions, respectively, are formed in place of the plurality of grooves 14a, 14b, 15a, and 15b in a substantially lattice shape in a first embodiment.

Except that the plurality of grooves 34a, 34b, 35a, and 35b extending substantially radially along different directions, respectively, are formed in place of the plurality of grooves 14a, 14b, 15a, and 15b in a substantially lattice shape, the back yoke 30 according to the mounting structure of the magnetic member 50, the method of bonding the magnetic member 50 and the magnetic coupling member 30, the pickup unit 3, and the disc apparatus 1 in a fourth embodiment is substantially the same in description as the back yoke 10I according to the mounting structure of the magnetic member 50, the method of bonding the magnetic member 50 and the magnetic coupling member 10I, the pickup unit 3, and the disc apparatus 1 in a first embodiment.

While the reference surface 16, the inclined surfaces 16a and 16b, the groove housing portion 16c, the groove depth (depth) 16d, the deep end 16e, the cross-sectional area (area) 16f, the angle 16g, etc., are described referring to FIG. 3 in describing the V grooves 14a, 14b, 15a, and 15b; the V grooves 34a, 34b, 35a, and 35b in FIG. 8 are the same in the detailed description as the reference surface 16, the inclined surfaces 16a and 16b, the groove housing portion 16c, the groove depth (depth) 16d, the deep end 16e, the cross-sectional area (area) 16f, the angle 16g, etc., in FIG. 3. In this case the reference surfaces 16 represents the reference surfaces 16 of the uneven portions 33a and 33b making up the adhesion securing portions 32a and 32b of the mounting surfaces 31a and 31b of the back yoke 30, for example.

In the mounting structure of the magnetic member 50, the method of bonding the magnetic member 50 and the magnetic coupling member 30, the pickup unit 3, and the disc apparatus 1 according to a fourth embodiment, which will be described referring to FIG. 8, substantially the same constituents in the descriptions of the mounting structure of the magnetic member 50, the method of bonding the magnetic member 50 and the magnetic coupling member 10I, the pickup unit 3, and the disc apparatus according to a first embodiment, which have been described referring to FIGS. 1 to 5, will be designated by the same reference numerals and detailed descriptions thereof will be omitted.

The substantially U-shaped back yoke 30 includes a base wall 38 formed into a substantially hollow rectangular plate-like shape and a pair of the side walls 30a and 30b extending substantially orthogonal to the base wall 38. The substantially rectangular mounting surface 31a serving as the mounting surface of the first side wall 30a making up the back yoke 30 is provided with the adhesion securing portion 32a for securing the adhesive strength of the adhesive 60. At the substantially center portion 36a of the substantially rectangular mounting surface 31a, an adhesive application target 37a, e.g., substantially round hole-shaped recession 37a is formed as a target when the adhesive 60 is applied. The substantially rectangular mounting surface 31b serving as the mounting surface of the second side wall 30b making up the back yoke 30 is provided with the adhesion securing portion 32b for securing the adhesive strength of the adhesive 60. At the substantially center portion 36b of the substantially rectangular mounting surface 31b, an adhesive application target 37b, e.g., substantially round hole-shaped recession 37b is formed as a target when the adhesive 60 is applied. The substantially rectangular plate-like base wall 38 making up the back yoke 30 has a substantially rectangular hole-shaped through-hole 39 through which laser light passes.

The adhesion securing portions 32a and 32b include the plurality of substantially radial uneven portions 33a and 33b, for example.

With the adhesion securing portions 32a and 32b formed as above, the magnets 50 are securely bonded securely to the back yoke 30. Before the magnets 50 is mounted on the back yoke 30 or after the magnets 50 have been mounted on the back yoke 30, the adhesive 60 applied to either one or both of the adhesion securing portions of the mounting surfaces 51 making up the magnets 50 and the adhesion securing portions 32a and 32b of the mounting surfaces 31a and 31b making up the back yoke 30 is easily spread on the plurality of substantially radial uneven portions, for example, which make up the adhesion securing portions of the mounting surfaces 51 of the magnets 50 or on the substantially radial uneven portions 33a and 33b, for example, which make up the adhesion securing portions 32a and 32b of the mounting surfaces 31a and 31b of the back yoke 30, due to the capillarity, thereby realizing secure surface bonding. Thus the adhesive strength of the magnets 50 to the back yoke 30 is secured without fail.

The adhesion securing portions 32a and 32b have the plurality of V grooves 34a, 34b, 35a and, 35b extending substantially radially, for example, from the substantially center portions 36a and 36b of the mounting surfaces 31a and 31b of the magnets 50 or the back yoke 30 toward substantially peripheries 36a and 36d of the mounting surfaces 31a and 31b.

With the adhesion securing portions 32a and 32b formed as above, the magnets 50 are securely bonded to the back yoke 30. The adhesion securing portions 32a and 32b disposed on either one or both of the magnets 50 and the back yoke 30 include the plurality of V grooves 34a, 34b, 35a, and 35b extending substantially radially, for example, from the substantially center portions 36a and 36b of the mounting surfaces 31a and 31b of the magnets 50 or the back yoke 30 toward the substantially peripheries 36c and 36d of the mounting surfaces 31a and 31b. Thus adhesive strength is secured, and the magnets 50 and the back yoke 30 are securely bonded together.

The adhesion securing portions 32a and 32b have the plurality of first direction V grooves 34a and 34b extending substantially along first directions, which indicate all the directions on the left side, for example, and the plurality of second direction V grooves 35a and 35b extending substantially along second directions, which are different from the first directions and indicate all the directions on the right side, for example.

With the adhesion securing portions 32a and 32b formed as above, the magnets 50 are securely bonded to the back yoke 30. The adhesion securing portions 32a and 32b disposed on either one or both of the magnets 50 and the back yoke 30 include the plurality of first direction V grooves 34a and 34b extending substantially along the first directions, which indicate all the directions on the left side, for example, and the plurality of second direction V grooves 35a and 35b extending substantially along the second directions, which are different from the first directions and indicate all the directions on the right side, for example. Thus adhesive strength is secured, and the magnets 50 and the back yoke 30 are securely bonded together.

The above embodiments of the present invention are simply for facilitating the understanding of the present invention and are not in any way to be construed as limiting the present invention. For example, such configuration may also be available that the left and right adhesive application targets (37a, 37a/37b, 37b) are formed on the mounting surfaces (31a/31b) of the magnets (50) or the back yoke (30), and the plurality of substantially radial V grooves (34a, 34b/35a, 35b) extends substantially radially, for example, from left and right two V groove starting center portions of the mounting surfaces (31a/31b) of the magnets (50) or the back yoke (30) toward the substantially peripheries (36c/36d) of the mounting surfaces (31a/31b) so that some of the V grooves (34a, 34b/35a, 35b) cross each other. The present invention may be modified or improved without departing from the spirit of the invention, and encompasses equivalents thereto.

What is claimed is:

1. A mounting structure of a magnetic member at least comprising:
    a magnetic member;
    a magnetic coupling member mounted with the magnetic member; and
    an adhesive member bonding the magnetic member to the magnetic coupling member,
    either one or both of the magnetic member and the magnetic coupling member provided with an adhesion securing portion configured to secure adhesive strength,
    either one or both of the magnetic member and the magnetic coupling member provided with an adhesive member reservoir portion configured to lead the adhesive member to the adhesion securing portion.

2. The mounting structure of the magnetic member of claim 1, wherein
    the adhesion securing portion is formed to include an uneven portion, wherein
    the adhesive member reservoir portion is formed to include a dent portion, and wherein
    the dent portion is located substantially on an upper side with respect to the uneven portion when the adhesive member that joins the magnetic member to the magnetic coupling member is applied to either one or both of the magnetic member and the magnetic coupling member.

3. The mounting structure of the magnetic member of claim 1, wherein
    the adhesion securing portion includes grooves, wherein
    the adhesive member reservoir portion includes a dent portion, and wherein
    the grooves and the dent portion are substantially the same in depth.

* * * * *

UNITED STATES PATENT AND TRADEMARK OFFICE
CERTIFICATE OF CORRECTION

| | | |
|---|---|---|
| PATENT NO. | : 8,533,749 B2 | Page 1 of 1 |
| APPLICATION NO. | : 13/657584 | |
| DATED | : September 10, 2013 | |
| INVENTOR(S) | : Morimoto et al. | |

It is certified that error appears in the above-identified patent and that said Letters Patent is hereby corrected as shown below:

In the Specification

Column 2, line 59: replace --Amounting-- with "A mounting".

Column 3, line 38: replace --amounting-- with "a mounting".

Column 10, line 50: replace --Asa-- with "As a".

Column 11, line 63: replace --anyone-- with "any one".

Column 31, line 32: replace --amain-- with "a main".

Column 43, line 2: replace --amounting-- with "a mounting".

Signed and Sealed this
Twenty-fifth Day of March, 2014

Michelle K. Lee
*Deputy Director of the United States Patent and Trademark Office*